US009058722B2

(12) United States Patent
Olsen

(10) Patent No.: US 9,058,722 B2
(45) Date of Patent: Jun. 16, 2015

(54) RANDOM PAYOUT SYSTEM AND METHOD FOR GAMING DEVICES

(71) Applicant: Eric B. Olsen, Henderson, NV (US)

(72) Inventor: Eric B. Olsen, Henderson, NV (US)

( * ) Notice: Subject to any disclaimer, the term of this patent is extended or adjusted under 35 U.S.C. 154(b) by 123 days.

(21) Appl. No.: 13/970,381

(22) Filed: Aug. 19, 2013

(65) Prior Publication Data

US 2013/0331172 A1 Dec. 12, 2013

Related U.S. Application Data

(63) Continuation-in-part of application No. 13/156,553, filed on Jun. 9, 2011, now Pat. No. 8,535,146.

(60) Provisional application No. 61/440,634, filed on Feb. 8, 2011.

(51) Int. Cl.
*G06F 17/00* (2006.01)
*G07F 17/32* (2006.01)

(52) U.S. Cl.
CPC ........ *G07F 17/3244* (2013.01); *G07F 17/3211* (2013.01); *G07F 17/3258* (2013.01); *G07F 17/326* (2013.01); *G07F 17/3272* (2013.01)

(58) Field of Classification Search
CPC . G07F 17/3227; G07F 17/32; G07F 17/3239; G07F 17/3267; G07F 17/3244
See application file for complete search history.

(56) References Cited

U.S. PATENT DOCUMENTS 6,358,149 B1 * 3/2002 Schneider et al. .............. 463/27
7,455,586 B2 * 11/2008 Nguyen et al. .................. 463/16

* cited by examiner

*Primary Examiner* — Dmitry Suhol
*Assistant Examiner* — Carl V Larsen
(74) *Attorney, Agent, or Firm* — Lightbulb IP, LLC

(57) ABSTRACT

A random payout system provides self-funding winning symbol combinations that allow various wagering games to be quickly and easily defined. The winning symbol combinations may individually be associated with a funding pool. Symbols from a winning symbol combination may be disabled or not presented when an associated funding pool is negative. The symbols may be activated or presented when the associated funding pool is non-negative. In this manner, the winning symbol combinations are self-funding. Funds for a funding pool may come from various sources including advertising revenue and placed wagers.

20 Claims, 8 Drawing Sheets

| PAY LEVEL | Symbol Combination | | | | | PAYS (Credits) | Funding (Inc %) | Enabled ? |
|---|---|---|---|---|---|---|---|---|
| 1 | JACK POT | JACK POT | JACK POT | JACK POT | JACK POT | 500 | .05% | YES |
| 2 | 7 | 7 | 7 | 7 | 7 | 100 | .05% | YES |
| 3 | 7 | 7 | 7 | 7 | (ANY) | 50 | .075% | YES |
| 4 | BAR BAR | BAR BAR | BAR BAR | BAR BAR | BAR BAR | 50 | .075% | YES |
| 5 | BAR BAR | BAR BAR | BAR BAR | BAR BAR | (ANY) | 25 | .075% | YES |
| 6 | BAR | BAR | BAR | BAR | BAR | 25 | .1% | YES |
| 7 | BAR | BAR | BAR | BAR | (ANY) | 10 | .15% | YES |
| 8 | | | | | | 6 | .1% | YES |
| 9 | | | | | | 4 | .2% | YES |
| 10 | | | | | | 2 | .2% | YES |

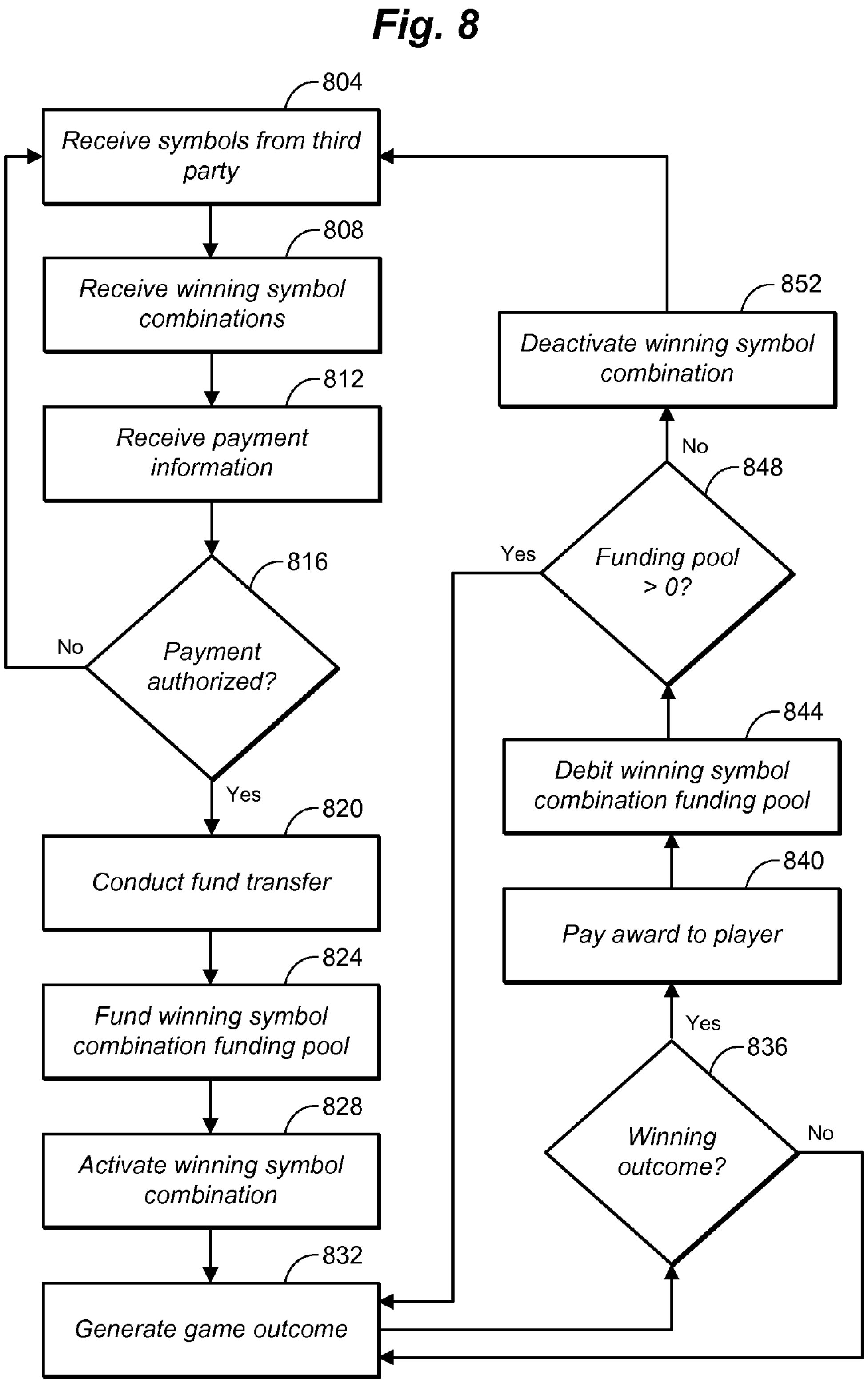
Fig. 8
804
Receive symbols from third party
808
Receive winning symbol combinations
812
Receive payment information
816
Payment authorized?
No
Yes
820
Conduct fund transfer
824
Fund winning symbol combination funding pool
828
Activate winning symbol combination
832
Generate game outcome
836
Winning outcome?
Yes
No
840
Pay award to player
844
Debit winning symbol combination funding pool
848
Funding pool > 0?
Yes
No
852
Deactivate winning symbol combination

RANDOM PAYOUT SYSTEM AND METHOD FOR GAMING DEVICES

CROSS-REFERENCE TO RELATED APPLICATION

This application is a continuation-in-part of U.S. patent application Ser. No. 13/156,553, filed Jun. 9, 2011, which claims the benefit of U.S. Provisional Patent Application No. 61/440,634, filed Feb. 8, 2011.

BACKGROUND OF THE INVENTION

1. Field of the Invention

The invention relates generally to gaming devices, and particularly to a method and apparatus for awarding random payments in a gaming device.

2. Related Art

Gaming devices have a long history. Included in this history is the advent of electronic gaming devices, such as the gaming machines used in casinos. In addition to physical gaming devices, there are also gaming devices that utilize software to present to a game the player using a display, CPU, and optionally, a network connection. In such devices and similar gaming devices, software and game algorithms are used to provide various wagering games.

Another historical development in gaming is the linking of games together using communications protocols and networks. The reasons for linking games vary. One reason involves coordinating a group of players' actions together for processing necessary game rules involving the group of players. Another reason involves network wide collection of wager information so that a link wide calculation of the total wagers played on the game network can be summed. This is accomplished with traditional progressive links, for instance.

In a traditional progressive jackpot link, a plurality of gaming devices are linked by an underlying network. A percentage of the total wagers played at every gaming machine is generally collected via the network and added to a progressive pool. A progressive pool is the amount of the current progressive jackpot. When a gaming device outcome resulting from a qualifying wager, matches the outcome required to win the progressive jackpot, the game awards the progressive jackpot to the player that achieved the winning outcome.

From the discussion that follows, it will become apparent that the present invention addresses the deficiencies associated with the prior art while providing numerous additional advantages and benefits not contemplated or possible with prior art constructions.

SUMMARY OF THE INVENTION

A random payout system and method is disclosed herein. In general, the random payout system provides a system by which random winning outcomes may be generated for various types of wagering games. The random payout system has the advantage of ensuring that the winning outcomes are funded before they may be achieved. This is advantageous in that it permits a wide variety of games and winning outcomes to be defined without the need for precise calculation of odds and payouts.

A random payout system may have various configurations. For instance, in one example embodiment, a random payout system for a wagering game comprises a communication device configured to receive one or more symbols and one or more winning symbol combinations from a remote terminal, a paytable having one or more awards, and a plurality of funding pools.

The winning symbol combinations include the symbols, while each of the awards is associated with at least one of the winning symbol combinations. In addition, each of the winning symbol combinations is associated with a distinct one of the plurality of funding pools.

A controller is also included. The controller is configured to receive a payment amount from the remote terminal, fund the funding pools with the payment amount, and present a game symbol from one of the winning symbol combinations when the winning symbol combination's associated funding pool is positive. The game symbol is not presented if the associated funding pool is not positive. The award associated with one of the plurality of winning symbol combinations is paid out when every game symbol within the winning symbol combination is presented to a player.

It is noted that the remote terminal may be connected to the communication device via a network, such as a wide area network or a local area network. In addition, the symbols may be uploaded to the remote terminal by a third party. The controller may decrement a funding pool associated with a winning symbol combination when the winning symbol combination occurs. Also, the controller may select the game symbol for presentation based on a predefined probability.

It is noted that the probability of each the plurality of winning symbol combinations occurring may be greater than a reciprocal of a number of wagers required to fund an associated award of the of the plurality of winning symbol combinations. The plurality of winning symbol combinations may be symbol combinations having a plurality of the same symbol.

In another exemplary embodiment, a random payout system for a wagering game comprises a communication device configured to receive one or more third party symbols and one or more winning symbol combinations consisting of the third party symbols from a remote terminal, a paytable comprising a plurality of winning outcomes, wherein at least one of the plurality of winning outcomes is one of the winning symbol combinations, and at least one controller.

The controller is configured to receive one or more payment amounts from the remote terminal, and payout an award when all symbols of one of the plurality of winning outcomes are presented. The probability of occurrence for each of the plurality of winning outcomes may be greater than a reciprocal of a number of wagers required to fund an associated award of the of the winning symbol combinations.

A plurality of funding pools, each associated with a distinct one of the plurality of winning outcomes, are also included. The controller is configured to allocate the payment amounts to one or more of the funding pools, and to individually decrement one of the plurality of funding pools upon occurrence of its associated winning outcome. Also, the controller is configured to present one or more symbols from a winning outcome as long as the winning outcome's associated funding pool is positive and to stop presenting the symbols from the winning outcome when the winning outcome's associated funding pool is negative.

It is contemplated that the controller may also receive one or more wager amounts corresponding to one or more wagers placed at one or more gaming machines in communication with the controller, and allocate at least a portion of the wager amounts to one or more of the plurality of funding pools. The controller may also accept a predefined probability of occurrence for the plurality of winning outcomes, whereby the plurality of winning outcomes occur as defined by their respective probability of occurrence.

Similar to above, the remote terminal may be connected to the communication device via a network, such as a wide area network or a local area network. In addition to the winning symbol combination received from the remote terminal, the paytable may also include one or more predefined winning outcomes.

Various methods for providing random payouts are also disclosed herein. For instance, in one exemplary embodiment a method for providing random payouts to one or more wagering game players is disclosed comprising providing a controller configured to accept one or more symbols and one or more winning symbol combinations from a remote terminal, the winning symbol combinations comprising the symbols, receiving account information and one or more payment amounts at a payment processor, and allocating the payment amounts to one or more of a plurality of funding pools.

The method also includes associating the each of the plurality of funding pools with at least one of the winning symbol combinations, disabling presentation of one or more symbols of a winning symbol combination when the winning symbol combination's funding pool is negative, and enabling presentation of one or more symbols of a winning symbol combination when the winning symbol combination's funding pool is non-negative. The players are awarded an award amount when one of the winning symbol combinations is achieved, and the funding pool associated with the winning symbol combination is then decremented.

It is noted that the symbols and the winning symbol combinations may be received from a third party at the remote terminal. The controller may connect to the remote via a network, such as a local area network or a wide area network. The paytable may comprise one or more preexisting and predefined winning symbol combinations and, in such cases, the controller will typically add the winning symbol combinations received from the remote terminal to the paytable as they are received.

One or more probabilities of occurrence may be received, such as by the controller, and associating the with the winning symbol combinations. The probabilities of occurrence for the winning outcomes may be greater than a reciprocal of a number of wagers required to fund the award amount of the winning symbol combinations.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 8 is a flow diagram illustrating operation of an exemplary random payout system.

DETAILED DESCRIPTION OF THE PREFERRED EMBODIMENTS

Figure 1:
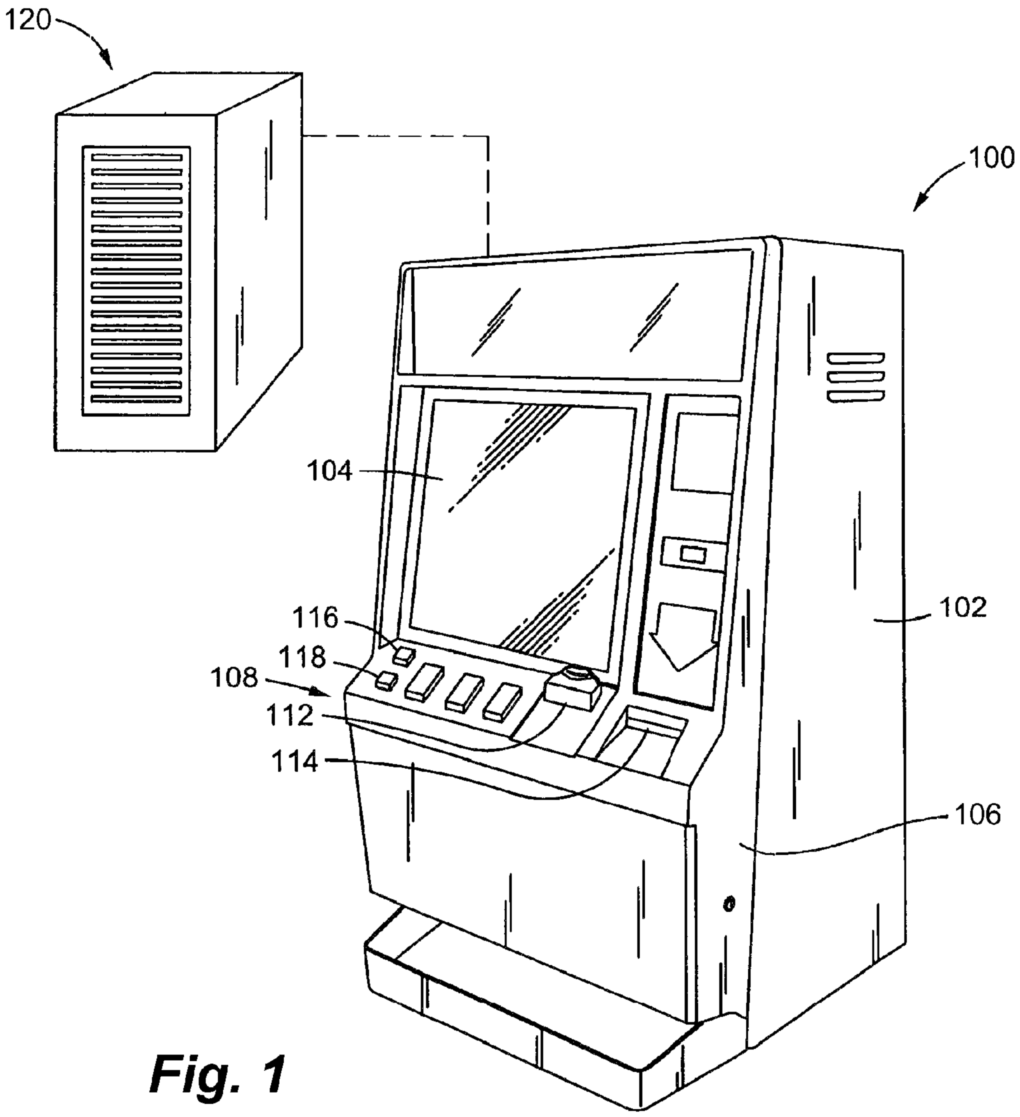
FIG. 1 illustrates an exemplary gaming machine at which the random payout system may be used.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

There is a need for a gaming device that provides a casino operator the ability to design custom games and custom paytables, without the tedious and time consuming work of calculating all the underlying mathematics for each individual game. The random payout system disclosed herein provides a system and method by which casino operators can define, create and configure their own games and bonus games. The random payout system accomplishes this while ensuring payouts to players are funded by the game without the need for complex mathematical analysis of a game. In this manner, and as will be discussed further below, the random payout system is self-regulating or self-funding.

As will be discussed further below, the random payout system also increases player awareness of bonus games and feedback in bonus games. This is in contrast to traditional bonuses, such as a traditional mystery jackpot that offers little if any feedback to players prior to being awarded. Players therefore forget about the bonus jackpot, and in fact, do not appreciate that they are participating in and have an opportunity to win the bonus jackpot on a game-by-game basis. This is one of the problems of traditional bonus games. The random payout system herein is capable of providing immediate feedback to the player from game to game. The player thus is made aware of a correspondence between his or her game play and the possibility for an award and is enticed to continue wagering. For example, in one embodiment, the random payout system allows a player to immediately realize that the greater their wager, the more bonus opportunities are available.

Another advantage of the method of the present invention is that it readily supports bonus games that do not require player eligibility rules to operate fairly. The present method supports symbol driven game play but may use progressive jackpot style funding to finance the awards generated. This is unique. Any player can at any time establish play with the linked bonus game without gaining an unreasonable benefit versus any other player. One advantage of not requiring player eligibility is that the system does not "lock out" any players wager at any time. Players enjoy game action at a sustained rate proportional to their own game play in many embodiments. Group wide bonus play can operate without having a bonus mode, which locks out in-eligible players from participating.

Some traditional bonus games and links will require player eligibility rules to maintain the fairness of the game. In such games, the bonus game does not work unless a player is eligible. This prevents players from capitalizing on advantageous opportunities of the game itself, such as by observing the game and playing when it appears the bonus is close to being awarded.

FIG. 1 illustrates one embodiment of a gaming machine 100 at which the random payout system may be implemented or used. In one embodiment, the gaming machine 100 is a wager-based gaming machine configured to present one or more games to a player, which games offer the possibility of an award of winnings. Of course, the gaming machine 100 could be configured to present games or amusing activities based upon payment and either not award winnings or offer the opportunity for points, tickets, prizes or the like.

In one embodiment, the gaming machine 100 defines a generally enclosed interior space for housing one or more components. As illustrated, the gaming machine 100 generally comprises a housing or cabinet 102 for supporting and/or enclosing various components required for operation of the gaming machine. In the embodiment illustrated, the housing 102 may include a door 106 located at a front thereof, the door capable of being moved between an open position that allows access to the interior and a closed position in which access to the interior is generally prevented. The configuration of the gaming machine 100 may vary. In the embodiment illustrated, the gaming machine 100 has an "upright" configuration. However, the gaming machine 100 could have other configurations, shapes or dimensions (such as being of a "slant"-type or other configuration as is well known to those of skill in the art). It is noted that the configuration of the door 106 may vary, such as dependent upon the configuration of the gaming machine 100.

The gaming machine 100 preferably includes at least one display device 104 configured to display game information. The display device 104 may be a mechanical, electro-mechanical or electronic display, such as one or more rotating reels, a video display or the like. When the display device 104 is an electronic video display, it may comprise a cathode ray tube (CRT), high resolution flat panel liquid crystal display (LCD), projection LCD, plasma display, field emission display, digital micro-mirror display (DMD), digital light processing display (DLP), LCD touchscreen, a light emitting display (LED), organic light emitting diode (OLED) display, or other suitable displays now known or later developed, in a variety of resolutions, sizes and formats (e.g. 4:3, widescreen or the like). The display 104 may be capable of projecting or displaying a wide variety of information, including images, symbols and other indicia or information associated with game play, game promotion or other events. In one embodiment, the display 104 may be used to present one or more paytables, game symbols, jackpot/payout amounts, bonus game information, etc. . . . associated with the random payout system. It is contemplated that more than one display 104 may be provided in a gaming machine. Each display 104 may present different information. For example, a display 104 may be used to present one or more paytables while another display is used to present a game.

The gaming machine 100 may be configured to present various styles or configurations of games having the inventive features described herein. These may include games in Class III, such as video poker games, keno, slot-type games, and blackjack or other card, dice or various other games now known or later developed, as well as games in Class II, including central determinant games such a video lottery, bingo and bingo-based games, and other games now known or later developed. The games may also be skill based or include one or more skill components. In one embodiment, certain game outcomes may be designated as winning outcomes. Awards may be provided for winning outcomes, such as monetary payments (or representations thereof, such as award of credits), prizes or the like. As is well known in the art, the number of winning outcomes may vary dependent upon the desired payout or winning percentage offered to the players as compared to wagers that are retained by the gaming establishment.

The gaming machine 100 may include one or more player input devices 108 (such as input buttons, a touch-screen display, joystick, touch-pad or the like) that may be utilized by the player to facilitate game play. The gaming machine 100 may include a coin accepting mechanism 112 for accepting coins and/or a currency or bill acceptor 114 for accepting cash or paper currency. It is also contemplated that other mechanisms now known or later developed may be provided for accepting value for game play, such as credit card, ticket readers or input devices whereby a player may have funds paid from a remote account. The gaming machine 100 may also include a "bet credit" button 118 or the like, such as to permit a player to wager monetary credits credited to the machine.

In one embodiment, the gaming machine 100 may include one or more microprocessors or controllers for controlling the gaming machine, including receiving player input and sending output signals for controlling the various components of the machine 100 (such as generating game information for display by the display 104). The controller may be arranged to send signals for determining winning combinations and to cause the display 104 to display winning amount information. In addition, the controller is preferably arranged to determine if a round of game play has resulted in a win, and if so, the amount to be paid to the player for that win.

The gaming machine 100 may include a means for paying a player any winnings accumulated during game play. For example, a "cash out" button 116 may be provided for permitting a player to be paid the winnings or redeeming any credits initially paid into the gaming machine 100. The term "cash out" is used herein to define an event initiated by the player wherein the player receives a number of coins or currency that is equivalent to the value of the player's accrued credit base. Typically when a player cashes out, the player receives either a paper currency voucher or currency in the form of a coin disbursement. If the player decides to receive a coin disbursement, the gaming machine 100 may activate a coin hopper or coin-handling device (not shown), which physically counts and delivers the proper number of coins to the player. The coin-handling device is commonly configured to transport coins from a supply source (hopper or bin filled with coins) to a coin tray or payout receptacle where the player physically receives the coins. The player might also elect to cash out by having a ticket or other media dispensed, such as via a printer.

The gaming machine 100 may be configured as a stand-alone device or be in communication with one or more external devices at one or more times. For example, the gaming machine 100 may be configured as a server based device and obtain game code or game outcome information from a remote server. The gaming machine 100 may also communicate with one or more gaming servers 120 or external controllers. These one or more gaming servers 120 may be configured to perform accounting, player tracking, bonusing, game generation, random outcome and payout generation, or other functions.

Figure 2:
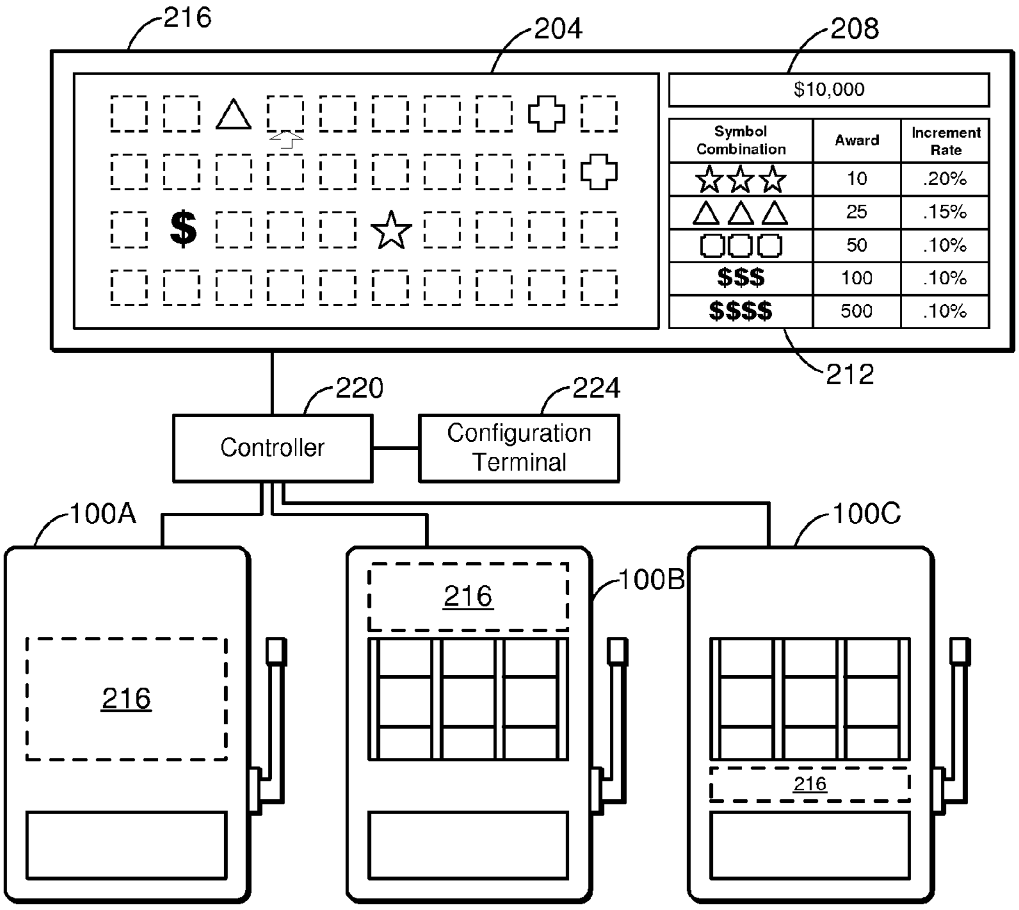
FIG. 2 is a block diagram illustrating an exemplary gaming environment at which the random payout system may be used.

FIG. 2 illustrates an exemplary gaming environment where the random payout system may be used. As can be seen, such an environment may comprise one or more gaming machines 100, and one or more random payout controllers 220. A random payout controller 220 may be a separate external device in communication with one or more gaming machines 100, or a random payout controller may be integral or part of one or more gaming machines in one or more embodiments.

One or more displays may be used as well to provide information regarding the games being played to one or more players. For example, displays for presenting bonus or base game symbols, paytables, payouts and other information may be provided. To illustrate, the exemplary embodiment of FIG. 2 includes a game symbol display 204, a payout amount display 208, and a paytable display 212. It is noted that these displays may be electronic, such as electronic signs, or be a static display. It is also noted that though the game symbol display 204 is shown as a scatter pay board, various other forms of game symbol displays may be used, including those described above. For example, rather than a scatter pay board implementation, a game symbol display 204 may present or comprise one or more reels, cards, or other gaming symbols in various arrangements.

One or more displays may be located in one or more display areas 216 which may comprise a physical structure that supports or holds one or more displays. Display areas 216 may be various sizes and at various locations. For example, the display area 216 of FIG. 2 could be a large public display area that is mounted on a wall of a gaming establishment. Alternatively, the display area 216 may be more private and be mounted or be part of individual gaming machines 100.

FIG. 2 illustrates some exemplary gaming machines 100 having display areas 216 for use with the random payout system. Gaming machine 100A utilizes a display area 216 for its primary display. In such embodiments, the display area 216 may include at least the game symbol display 204 (and other displays if desired).

Gaming machines 100B,100C illustrate gaming machines where the display area 216 for use with the random payout system is optional. In such embodiments, the display area 216 may have displays (including game symbol displays) for secondary or bonus games. As can be seen from gaming machines 100B,100C, the location of a display area 216 may vary.

It is contemplated that a display area 216 may be overlaid on or be a predefined portion of an existing display area of a gaming machine. In this manner, the symbol display 204, payout amount display 208, and paytable display 212 individually or in various combinations may be presented on a gaming machine simultaneously with other wagering games.

It is contemplated that in some embodiments, a display area 216 may be activated and deactivated, such that the display area is hidden, faded or otherwise obscured from view when deactivated and revealed and/or made readily viewable when activated. For example, in a bonus game utilizing the random payout system, a display area 216 on a gaming machine may only be activated when the bonus game has been triggered, such as by the player achieving a requisite outcome at the base game of the gaming machine or by the player wagering above a predefined minimum amount (as may be determined by a payout controller). This allows games utilizing the random payout system to "pop up" only when relevant.

A payout controller 220 may be configured to collect/receive wager information and other information generated as players play the one or more gaming machines 100. As will be described further below, the random payout controller 200 may also utilize this information to fund one or more award pools and generate various outputs. For example, the random payout controller 200 may generate particular game play symbols or not generate particular game play symbols based on wager information, award pool funding levels, or both.

In some embodiments a configuration terminal 224 may be provided. In general, the configuration terminal 224 may be used to design or configure one or more wagering games, including bonus or secondary games. The configuration terminal 224 may also or alternatively be used to reconfigure a wagering game, even as the game is being played in some instances. This is because, as disclosed herein, the random payout system provides winning symbol combinations that are self-regulating. As such, the winning symbol combinations may be defined and redefined as desired, while remaining self-regulated. This allows a gaming establishment and/or game designed (or even a player) to pick different winning symbol combinations that may be in a game. The self-regulating nature of the random payout system ensures that the winning symbol combinations, whatever they may be, are self-funded as is disclosed herein.

It is noted that the configuration terminal 224 may be a separate terminal device, such as shown in FIG. 2. The configuration terminal 224 may comprise one or more input devices and/or one or more output devices. For example, the configuration terminal 224 may comprise a display screen, mouse, and/or keyboard. Other input/output devices may be used as well. For instance, a configuration terminal 224 could have a touch screen. The input/output devices may be used to configure and/or reconfigure one or more winning symbol combinations for one or more games. For example, individual symbols could be added or removed from winning symbol combinations. Winning symbol combinations could be added or removed from a game. A user interface may be presented via a configuration terminal 224. Such user interface may display the contents one or more winning symbol combinations and allow individual symbols to be added or removed therefrom. The user interface may also permit individual symbols to be placed in a desired order. In one embodiment, the user interface may allow a user to draw or otherwise create new symbols or import symbols from another source. The user interface may also allow a user to define award amounts and increment rates for a winning symbol combination.

Operation of an exemplary random payout system will now be described. Unique to the random payout system is that award/funding pools are associated with specific winning symbol combinations. For example, if the occurrence of three identical symbols defines a winning symbol combination, then an associated funding pool will exist for that winning symbol combination. Another unique feature is that the funding pool is not necessarily awarded. For example, in one embodiment, a fixed value, or a fixed value plus some additional increment may be awarded from a funding pool. In another embodiment, the current value of a funding pool associated with the winning symbol combination may be awarded.

When a winning symbol combination is achieved, the current value of the funding pool is reduced by the amount of the award that is paid out. Importantly, the value of a funding pool may be negative after this reduction. The random payout system is capable of handling such negative amounts in one or more of its funding pools. For example, in one embodiment, if a progressive pool associated to a winning symbol combination remains positive, the associated winning symbol combination remains enabled (or is enabled), and therefore, it remains possible for that particular winning symbol combination to be generated. If however, the funding pool for the winning symbol combination is zero or negative, symbol generation for that winning symbol combination is disabled. Therefore the winning symbol combination is disabled and cannot be generated and therefore not paid to the player. Once negative or zero, a given number of wagers must be made before the associated funding pool, (being contributed to by a percentage of placed wagers), will go positive, and hence enabled symbol generation again.

The random payout system allows a variety of paytables to be defined quickly and easily. Since winning symbol combinations that are insufficiently funded (i.e., negative or zero) are disabled, the random payout system self regulates payouts and funding pool funding. Thus a gaming establishment need not be focused strictly on the odds or payout rates of its paytables, but may instead focus on defining winning symbol combinations that are enticing or engaging to players. In addition, the self-regulating nature of the random payout system allows paytables to be updated or modified just as easily. For example, a user, such as a gaming establishment employee, may add, remove, or modify one or more winning symbol combinations to change a game. The user need not worry about the odds or payout rates since, as will be discussed further below, the random payout system is self-regulating. This helps ensure that the gaming establishment is making rather than losing money as players play.

Figure 3:
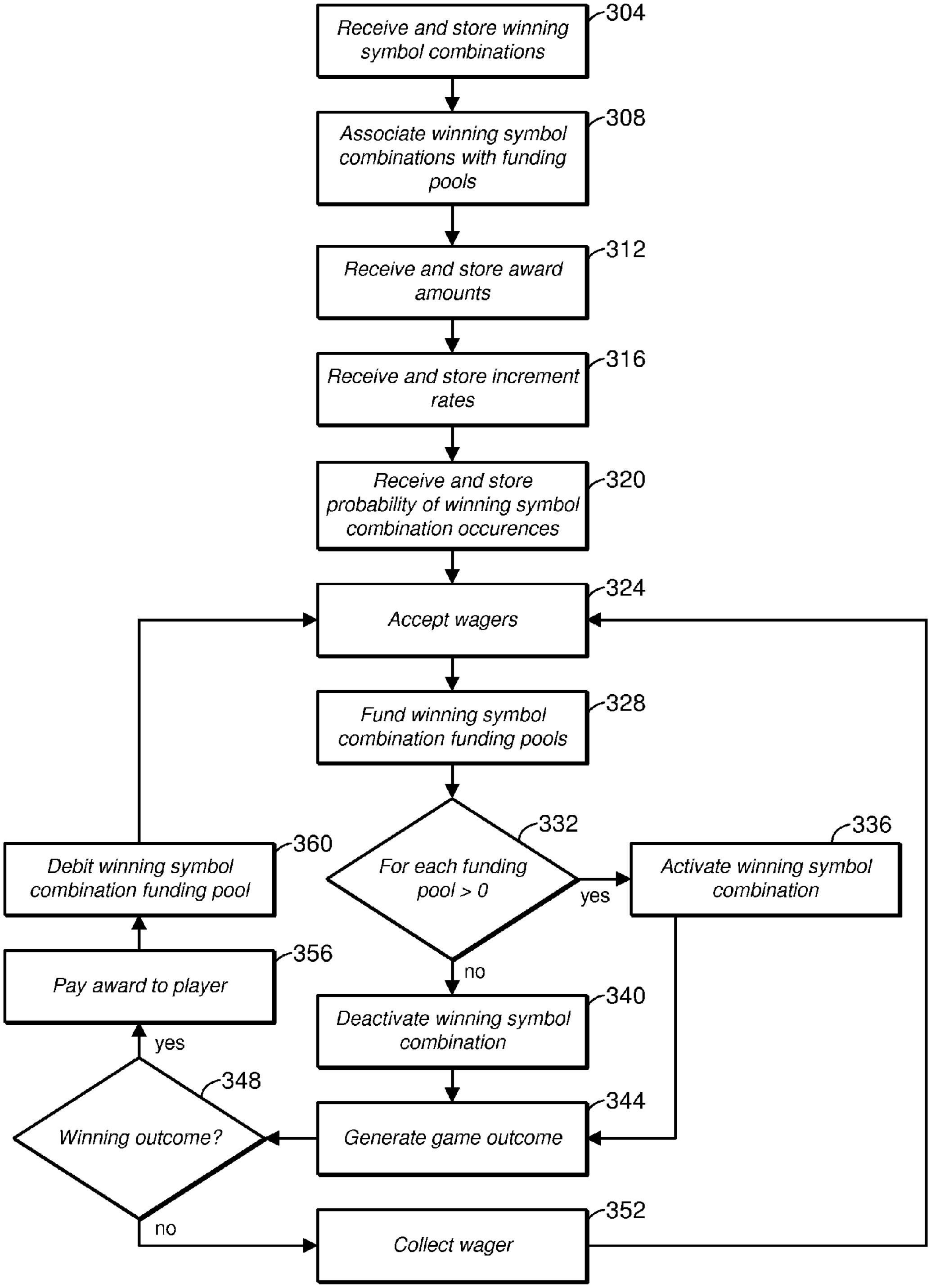
FIG. 3 is a flow diagram illustrating operation of an exemplary random payout system.

Operation of the random payout system will now be described with regard to FIG. 3. FIG. 3 is a flow diagram illustrating operation of an exemplary random payout system. It is noted that in one or more embodiments, one or more random payout controllers or servers may provide or implement the random payout system in various gaming environments. For example, the random payout system may be implemented by a controller that is internal to a gaming machine. In such embodiments, the controller may be used only by the gaming machine. Alternatively, the random payout system may be implemented by an external controller or server in communication with one or more gaming machines. In such embodiments, the funding pools may be funded by wagers from more than one gaming machine.

At a step 304, the random payout controller may receive one or more winning symbol combination definitions. In general, each winning symbol combination may define a winning outcome, such that if a winning symbol combination is received by a player, that player will be deemed a winner and awarded a payout.

The winning symbol combinations may vary in what symbols they contain, their length, and other characteristics. For example, the winning symbol combinations may contain one or more slot symbols, card symbols, numbers, and other indicia. A winning symbol combination may consist of a single symbol or may be multiple symbols. In some embodiments, the winning symbol combinations may be defined such that their symbols must occur in a particular order in order to constitute a winning combination.

A user, such as gaming establishment personnel, may define the winning symbol combinations by entering them into the controller, such as via a terminal or other input device. Alternatively the controller may have its own input device to accept the winning symbol combinations. For example, the controller may have a screen, keyboard, mouse, or the like to allow a user to define the winning symbol combinations. The controller may store the definitions on a storage device or storage medium, such as a hard drive, memory device, magnetic or optical disk, flash memory. The storage device or storage medium may be local to the controller or may be an external device that is accessible by the controller. As discussed above, since the random payout system is self-regulating, the user is free to define a wide variety of winning symbol combinations without having to calculate the odds or payout rates of every defined winning symbol combination.

At a step 308, the winning symbol combinations may be associated with a funding pool. Typically, each winning symbol combination will typically be associated with its own funding pool. In this manner, each winning symbol combination may be independently funded. In addition awards from achieving a winning symbol combination may then be paid from the particular symbol combination's own funding pool. As will be described below, this advantageous because it allows a gaming machine to quickly determine if a winning symbol combination is sufficiently funded to support the payout of one or more awards should a player achieve the winning symbol combination.

At a step 312, the award or prize for the winning symbol combinations may be defined. For example, each winning symbol combination may have an associated payout amount. If a player achieves a winning symbol combination, its associated payout may then be paid to the player. It is contemplated that one or more symbol combinations may have the same payout or award or that the symbol combinations may each have a different payout or award.

At a step 316, the rate at which the funding pools are incremented (i.e., funded) may be defined. This may occur in various ways. For example, a percentage of a wager may be defined as the rate. Alternatively, a fixed amount of a wager may be defined as the rate. Various rules may be used to define the rate as well. For instance, a percentage of a wager may be collected by a funding pool only where the wager is above a particular amount. Alternatively or in addition, a larger portion of a wager may be collected by a funding pool as the size of the wager meets increasing predefined threshold sizes.

A global scaling parameter, referred to herein as the "unit bet", may be defined as well in some embodiments. The unit bet may be various denominations and various amounts of value, such as a penny, for example. If the unit bet is defined, the increment rate may be defined based on the unit bet. For example, the increment rate may be a percentage or portion of the unit bet.

At a step 320, the probability of a winning symbol combination occurrence may be defined. In general, such probability controls the likelihood of a player achieving the winning symbol combination and thus winning its associated award. The random payout system allows the probability of a winning symbol combination occurrence to vary within a wide range, and a user may set the probability as desired. The probability of a winning symbol combination occurring may be used to change how often and in what way rewards are paid by the random payout system. In one embodiment for example, as long as the probability of a winning symbol combination occurring is greater than or equal to the reciprocal of the number of game wagers required (to fund the award), the payout amount for that symbol combination's award will be equal to or less than the amount of funds collected in the symbol combination's funding pool at the increment rate over the long average (i.e., the winning symbol combination funds and regulates itself). This relationship is shown by the equation, $$P(w) \geq \frac{ir \cdot uw}{A},$$

where P(w) is the probability of a winning symbol combination occurring, A is the amount of an award, it is the increment rate and uw is a value of a unit wager.

Thus, the random payout system is self-regulating because a winning symbol combination in the random payout system pays an amount less than or equal to the funds collected by the winning symbol combination's funding pool over time. It is noted that the above assumes the award payout is equal to a preset amount. If an award payout, such as in the case of a progressive or other bonus, pays out the entire contents of a winning symbol combination's funding pool, then the payout amount for such award over time will equal to the funds collected by the award's funding pool. Further disclosure regarding the probability of winning symbol combination occurrence and effects thereof will be described below.

An exemplary wagering game utilizing the random payout system will now be described. It is contemplated that a variety of wagering games may be used with the random payout system, as will be disclosed below. At a step 324, one or more wagers may be collected or received, such as at one or more gaming machines. At a step 328, a portion of the collected wagers may be used to fund the funding pools associated with one or more winning symbol combinations of the wagering game. At a step 332, individual winning symbol combinations may be activated or deactivated based on the level of funds (e.g., amount of funding) in their associated funding pools. As can be seen, if a winning symbol combination's funding pool is greater than zero (i.e. positive), it may be activated at a step 336. If a symbol combination's funding pool is not greater than zero (i.e., zero or negative) it may be deactivated at a step 340.

As disclosed above, a deactivated winning symbol combination may be gated such that the winning symbol combination cannot occur. This may be accomplished by preventing any individual symbol of the winning symbol combination from being presented, or by preventing one or more of the individual symbols from occurring in a combination that would match the winning symbol combination. To illustrate the former, no cherry symbols would be shown if a winning symbol combination consisting of a plurality of cherries (or just one cherry) is disabled. To illustrate the later, an $n^{th}$ cherry would not be shown if a winning symbol combination consisting of n cherries is disabled, where n is an integer. However, cherries could be presented prior to that in this example.

It is noted that, if the funding pool for a winning symbol combination is deactivated, an indicator of this may be presented to a player. In this manner, the player can be made aware that the deactivated winning symbol combination is not currently available and thus cannot be achieved. Such an indicator may be presented on a screen, display, or the like of a gaming machine.

Activation of a winning symbol combination may occur by removing the deactivation (if applicable) and/or by allowing symbols to be presented such that they form the winning symbol combination. With regard to the above examples, the cherry symbol may be presented, or an $n^{th}$ cherry may be presented once again.

Once the winning symbol combinations have been activated or deactivated an outcome for the wagering game may be generated at a step 344. Typically, each winning symbol combination will be evaluated and activated or deactivated as described above with regard to steps 332, 336, and 340. It is contemplated that a subset of all the winning symbol combinations may be evaluated and activated or deactivated in some embodiments. This allows the wagering game to have a base or default set of winning symbol combinations that may always be available. It is noted that winning symbol combinations that share a funding pool, if any, may be evaluated and activated or deactivated together.

Generation of an outcome may occur by presenting one or more symbols or other indicia, such as at a display of a gaming machine or other display of the random payout system. At a step 348, the outcome may be evaluated to determine if the outcome is a winning outcome. This may occur by comparing the outcome to the winning symbol combinations. In some embodiments, only the active or activated winning symbol combinations will take part in this comparison. If the outcome matches an activated winning symbol combination, it may be deemed a winning outcome. Otherwise the outcome may be deemed a losing outcome.

If the outcome is not a winning outcome the player's wager may be collected, such as by the gaming machine or gaming establishment at a step 352. If the outcome is a winning outcome, the player may be paid an award associated with the winning symbol combination that occurred. At a step 360, the amount of the award may be subtracted from the winning symbol combination's associated funding pool. In one or more embodiments, the actual payment of the award may comprise funds from the winning symbol combination's funding pool. The process may then return to step 324, where another wager may be collected, such as to start a new round or game.

Figure 4A:
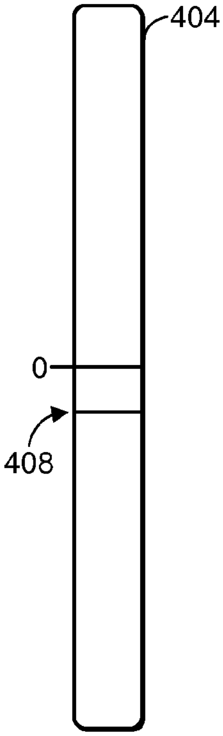
FIGS. 4A-4C is a block diagram illustrating operation of an exemplary funding pool of the random payout system.
Figure 4B:
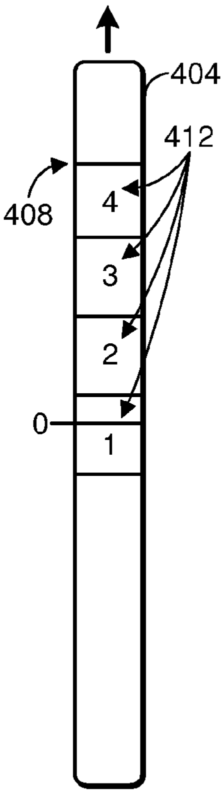
Figure 4C:
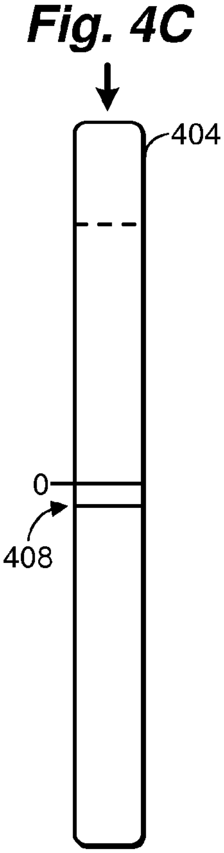

FIGS. 4A-4C illustrate the self-regulating or self-funding aspects of the random payout system. Namely, FIGS. 4A-4C illustrate operation of an exemplary funding pool 404 associated with a winning symbol combination. The vertical bars shown illustrate the level or amount of funds that a funding pool 404 may have. In the embodiments shown for example, funding pools 404 may have zero funds (as shown by the central zero indicator of each funding pool, or may have positive or negative amounts or levels of funds. The marker 408 points to the current level of funds for a particular funding pool 404.

Referring to FIG. 4A, it can be seen that the funding pool has negative funds. Because of this, the winning symbol combination associated with this funding pool may be gated or disabled, such that it cannot be achieved or won. Once the funding level becomes positive the winning symbol combination associated with the funding pool may be activated so that it can be achieved or won.

FIG. 4B illustrates the "re-funding" of the funding pool 404 such that it is positive and its associated winning symbol combination is activated. As described above, the funding pool may be funded by taking a portion of placed wagers, referred to herein as a wager contribution 412. For example, in FIG. 4B, wager contributions 412 of four wagers have funded the funding pool to a positive level. It is noted that in the example of FIG. 4B, the first wager's contribution 412, labeled 1, would be sufficient to make the funding pool 404 positive and thus activate the associated winning symbol combination. It is noted that multiple wagers could be necessary to make the funding pool positive 404 in some situations. The sum of the portions 412 from the four wagers move the marker 408 well above zero in this example to the level shown by the marker 408.

FIG. 4C illustrates the funding pool 404 after an award has been paid. For instance, if the winning symbol combination associated with the funding pool 404 is achieved, the award may be paid. As disclosed above, the award amount may be subtracted from the funding pool 404. FIG. 4C illustrates an example where the funding level is again negative after payment of the award, as shown by the marker 408. The funding level could be zero if the award amount is equal to the level of positive funds in the funding pool 404. It is noted that, in some embodiments, the award may not be a fixed amount. For example, a bonus or jackpot award may be the entire funding pool. In such situations, the funding level may be set to zero since all available funds would be paid out.

As can be seen, the payout for each winning symbol combination is self-regulated since the only funds awarded are funds accrued by a winning symbol combination's associated funding pool. In addition, the random payout system's winning symbol combinations are self-regulated across the range of probabilities for the occurrence of the winning symbol combinations.

For example, the probability of the winning symbol combination occurrence could even be set to 100%, and the wining symbol combination would still fund itself automatically because the next occurrence of that winning symbol combination would not occur until its associated funding pool is positive and the winning symbol combination is activated.

If the probability of a winning symbol combination's occurrence is adjusted to be very close, and just greater than, the reciprocal of the number of unit wager contributions required to fund an award, the winning symbol combination will occur (on average) just before the winning symbol combination's award is funded. In such case, the funding pool may go negative, but on average, only by a small amount. For example, the funding pool may be negative a fraction of the amount of the award. It will return on average to a positive level sooner than if the probability of award occurrence is set greater.

To illustrate, the number of wager contributions 412 required to fund an award may be $$\frac{A}{ir \cdot uw},$$

where A is the award amount, it is the increment rate, and uw is a unit wager amount. In other words, this is the number of wagers required to form a total contribution of at least A. If the probability of the winning symbol combination's occurrence is set to greater than the reciprocal of this number, or $$P(w) \geq \frac{ir \cdot uw}{A},$$

as disclosed above, the winning symbol combination will occur before the award is funded. It is noted that the number of wager contributions 412 could also be thought of as the number of games or number of wagers collected in one or more embodiments. It is also noted that if a winning symbol combination has more than one award, the average amount of the awards may be used in the above calculation, such as to set a probability for the winning symbol combination's occurrence.

To illustrate with an example, assume an exemplary award of 1 credit, an increment rate of 10% and a unit wager amount of 2, five wager contributions 412 would be required to fund such an award. The reciprocal of this would be 10%·2/1 , or 20%. Setting the probability of the winning symbol combination's occurrence greater than this, say 25% for example, would cause the award to be paid before five wager contributions have been collected and thus before the winning symbol combination is fully funded. As shown in FIG. 4B for example, the winning symbol combination occurs after the fourth wager contribution 412 (but before the fifth wager contribution) causing the funding level of the funding pool 404 to be slightly negative in FIG. 4C. Setting the probability of the winning symbol combination's occurrence to slightly greater than 20%, say 21% (or less), would cause the winning symbol combination to occur just before its award is fully funded. Over time, the amount the funding pool is negative will be 4% smaller than in the previous example.

Having a negative funding pool may be part of the self-regulation process and, as stated, results in disabling of an award. A gaming establishment or game designed may wish to offer as many awards as possible and, as such, may desire to reduce or limit the amount of time that winning symbol combinations are disabled. Thus, the amount of time a funding pool is negative may be minimized in one or more embodiments.

In another embodiment, the probability of the winning symbol combination occurring may be set to less than the reciprocal of the number of wager contributions 412 needed to fund an award. In such an embodiment, the funding pool will, on average, grow to value larger than the award (in the case of a preset or fixed award). This is because the probability of the winning symbol combination occurring will cause it to (according to the set probability) occur after the award is fully funded. In other words, the funding pool 404 may have funds greater than that need to pay the award.

This overage of funds may be used in various ways. In one embodiment, such as where the random payout system is used to award bonus or jackpot awards, the overage may be awarded as part of the award (i.e., the entire funding pool is awarded). In another embodiment, the overage may be used to fund other awards, such as secondary bonus games, jackpots, and the like. Alternatively, the overage may be collected by a gaming establishment as part of its winnings or profits. The overage could even be returned to the player, such as at the end of the player's gaming session.

It is contemplated that both methods could be supported simultaneously. For example, if the probability of the associated award is sufficiently large, the funding pool is sufficiently regulated, so average payback would equal increment rate, and a fixed award is paid to the player for each winning symbol combination that occurs. If the probability of the award is sufficiently small, the progressive pool may grow sufficiently large, beyond a fixed reference value; so the award paid is not fixed, but equal to the funds collected/contained in the funding pool. This is an example of the random payout system operating as a "progressive award", since the award paid continues to grow in amount until the award is finally won by a player. Progressive awards are generally set back to a base value, which in this case is equal to the reset, or reference, fixed jackpot value.

The random payout system may provide a variety of self-regulated self-funded wagering games. In one or more embodiments for example, the random payout system could be configured as a bonus game where one or more winning symbol combinations are associated with jackpot or bonus award funding pools. The winning symbol combinations could comprise scatter pay symbols, slot symbols, or various other indicia. In other embodiments, the random payout system could be configured as a base game. For example, a traditional slot game could be provided by the random payout system. By utilizing the random payout system, the slot game (or other base game) would have self-regulating winning symbol combinations. In addition, since a base or bonus wagering game implemented with the random payout system is self-regulating, users are free to define a wide variety of winning symbol combinations without having to worry about what changes to the odds of the game would result. It is contemplated that a paytable comprising one or more winning symbol combinations could even be changed between or during wagering games with the random payout system. For example, individually winning symbol combinations could be modified and/or winning symbol combinations could be added or removed from a game. Some exemplary games will now be described in the following.

Description of a Bonus Gaming Method

In a bonus game that allows a player to select from a plurality of bonus prizes, the random payout system can be used in several ways. In one exemplary embodiment, the system uses a single fixed award probability to decide when a player is to win a jackpot. A plurality of jackpots may be presented, each associated to a funding pool. If the funding pool is positive, the award is available for selection. If the funding pool is negative, it is not be available for selection. Selection criteria can be weighted or simply even. In the long average, as long as the award expectation is greater than the sum of wager increments to the pool, the system will fund at the level of the increment rates, without regard to the frequency of any given jackpot.

In an alternate version of the game concept, the system supports each jackpot as a symbol award, each symbol award with its own probability of occurrence. The player only knows that they have won, and the reveal (i.e., decision) of the jackpot prize is simply done as an animation, because the controller already knows the winner. In this version, the player cannot truly influence the selection of the award, instead, the controller acts as if the player has, but in reality, the decision has been made beforehand.

In one embodiment, a linked network game is applied to a plurality of classical game types to add a secondary bonus game feature. Providing a programmable and configurable secondary game feature is a current need for gaming operators.

In another embodiment, a central computer connects to a plurality of gaming devices, or gaming interface devices, to establish a network connection between all connected gaming devices. In one typical embodiment, a network connection allows the central computer to monitor and receive event and other data information from each gaming device in real time. This is well understood in the art. Specific to link type bonus devices, there is a requirement that the central computer receive an event message (or otherwise track) whenever a wager is made at each gaming device. This message and or other messages establish the value of the wager made for each game start initiated on the underlying gaming devices. Wager information is processed, normally in real time, to determine the value and outcome of the random jackpot prize. Normally, a percentage of the wager is calculated and added to one or more jackpot pools. If a pre-determined event or sequence of events has occurred, one or more bonus jackpots may be awarded.

Application to Scatter Pay Bonus Game Example

In one embodiment, a scatter pay link bonus game is processed and funded using the method of the present invention. In this particular example, consider a symbol matrix of 10 symbols wide by 4 symbols tall for a total of 40 symbols shown at once, such as shown in FIG. 2. A unique symbol matrix is displayed at each connected gaming device using an LCD or other conventional display device. The symbols displayed at each matrix of each connected gaming device are sent via a central bonus server, or bonus controller.

The controller of the bonus link is so programmed to receive message(s) for each game wager from each connected gaming device. A percentage, or "increment rate", is defined for each symbol combination supported by the bonus game; this increment rate essentially defines a percentage contribution of each wager. For each symbol award defined, the percentage contribution of each wager is added to a progressive jackpot funding pool associated with the specific award.

The user may define, or the game may come pre-defined, with a specific number of jackpot payouts. Each jackpot payout is awarded to the player when a specified number of identical symbols occur on the symbol matrix. Therefore, a bonus game can be designed with any number of jackpot awards. In one example embodiment, there is one unique symbol for each award combination. In this example, the bonus will pay an award when any three of a specific symbol is present on the screen symbol matrix. The controller issues a new symbol for every unit bet; this symbol replaces the oldest symbol on the display matrix of the game making the unit bet.

In one embodiment, if the player bets 5 unit bets, then 5 new symbols appear on the bonus display matrix; each symbol generation also generating a cycle to determine if a win has occurred. For example, if during the generation of a symbol, the controller determines that 3 symbols now exist on the bonus game matrix, an award associated with that symbol occurrence is paid to the player. The bonus symbols satisfying the award combination are then deleted from the bonus matrix display so that it is clear to the player the symbols have been used. The game display is then made ready for the next game wager cycle.

In a modification of the embodiment above, the bonus game cycle to determine a winner is postponed until all symbols are displayed on the matrix (for a given game wager). In this modification, award paytables that support pays for more than one set of identical symbols can be supported. For example, a paytable can be created to pay 5 credits for three star symbols, 25 credits for 4 star symbols, and 100 credits for 5 star symbols. After symbol generation, the highest paying symbol combination is generally paid to the player, although other variations exist. For example, all occurring winning combination jackpots could be paid, in which case, all affected jackpot pools are debited by their associated award value.

The method of the present invention can support complex symbol combinations in paytables, as shown in this example, using a number of novel approaches. In one approach, the probability of a given symbol occurring after a given number of the same symbol having been issued is modified appropriately. This modification accounts for the various cross effect variables, including the time that symbol generation is disabled as a result of awards of lesser number of the same symbol. It should be noted that symbol frequency need only be estimated, since the method will self regulate. Symbol generation frequency is chosen, or so estimated, to provide a probability that ensures the award funding is regulated and stable by satisfying $$P(w) \geq \frac{ir \cdot uw}{A},$$

and to maximize the amount of time awards are enabled over time and on average. In this approach, all pay levels (awards) of the same symbol are enabled and disabled together.

For example, a bonus game pays 100 credits if a particular symbol occurs 4 times, and pays 500 credits if that same symbol occurs 5 times. If the "4 symbol" jackpot is awarded, and its associated funding pool is now negative, then symbol generation is disabled. By default, the "5 symbol" jackpot is also temporarily disabled. In the case that the "5 symbol" award funding pool is negative, the "5 symbol" award is inhibited, but the "4 symbol" jackpot is still available. Therefore, the symbol generator follows a new rule, whereby the generation of a fifth symbol is disabled given that four have been issued. In this way, the system will regulate the occurrence of each award over time to meet, or by some smaller amount, the expected funding interval given the user specified increment rate for each award of a given symbol. This method works for many types of bonus game paytables since it is customary to pay ever more infrequent symbol combinations with larger awards.

In another embodiment, a single funding pool is used to fund all pay-level awards consisting of the same symbol. A paytable can be modified to show this by combining the increment rate funding for all awards into one overall contribution. Again, symbol generation is disabled when the funding pool is negative. It is enabled when the funding pool is positive. In one option, symbol generation frequency is modified dynamically given a specific number, or state, of symbol generation having occurred; again, the specific frequencies of symbol generation chosen, or so estimated, is to maximize the amount of time the awards are enabled over time and on average.

In another modification of the embodiment above, sets of non-identical symbols can generate awards, where such non-similar symbols are also contained in other award symbol combinations. In this embodiment, each award (i.e. symbol combination) is funded by an associated progressive funding pool. When the progressive funding pool goes negative, at least one symbol of the set must be disabled to negate the possibility the symbol set will occur. In this case, funding for pools associated with awards containing the same disabled symbol increase disproportionately and over accumulate (not regulate). In this case, the award pools that over-accumulate are offered as progressive bonus jackpots in one embodiment. Therefore, even though the complexity of the probabilities of dissimilar symbol sets grows, the funding method of the present invention remains simple and is self-regulated. It is noted that suggestions generated by a computer can be offered to simplify hazards and un-desirable effects of cross symbol award combinations.

In another embodiment, complications resulting from mixed symbol and variable symbol combination (awards) may be resolved using a novel approach to game symbol generation in the present invention. The CPU generates a sample symbol sequence first. If a disabled symbol combination is present, the CPU generates another fair sequence. This is repeated until an outcome is generated which does not contain disabled symbol combination(s). At that point, the outcome of the bonus game may be presented to the player.

In another embodiment, a scatter-pay game is incorporated as a based game, and funded using the method of the present invention. In this case, the increment rate set for base game is generally larger. The overall game payback for conventional casino video slots is from 80% to 90%. Therefore, as a base game, the random payout system may be modified to operate as a standalone game. For example, the base game wager fully funds the bonus award pools implemented by the method. The casino operator sets a total increment rate for all awards defined to a desired value, perhaps in the 80% to 90% range as indicated. Payouts, awards availability and funding operate as described in the method of the present invention.

Application to Reel Symbol Bonus Pays

Many games and bonus games may be supported and processed by the method of the present invention. One game in particular is a video slot machine. For example, a bonus game that is presented in the form of a set of slot reels can be displayed to the player using a display such as an LCD display.

The video slot display may have of a set of reels, each reel having a plurality of positions, or indexes, for symbols. The slot game is played when a player wager is placed. The slot reels appear to spin, and each reel stops at a given location. The final symbol generation is revealed as symbols occupying the indexes of each reel. Multiple pay-lines are established which define sets of ordered symbols for final game result. Winning symbol sets and combinations are defined and their associated awards are displayed in the paytable of the game. It is noted that the rules may vary and many variations beyond this basic example may be used as well.

As stated, in the random payout system, increment rates may be associated with each pay-level award. As long as the probability that a winning symbol combination occurs at or just before the award is accrued (i.e., funded), its award can be offered for the jackpot, and is self-regulating/self-funding. As long as the award funding pool is positive, symbol generation is enabled, and the award is available. If the award funding pool goes negative, at least one symbol in one reel location must be disabled so as to disable the symbol combination from occurring until the award funding pool goes positive. Several possible methods are defined for disabling the award combinations.

In one embodiment, complications resulting from mixed symbol and shared symbol combination awards may be resolved using a novel approach to game symbol generation in the present invention. The CPU may generate a sample symbol sequence first. If a disabled symbol combination is present, the CPU generates another fair sequence. This is repeated until a fair outcome is achieved which does not contain disabled symbol combination(s). Algorithms taking advantage of this approach must decide whether this loop is infinite. For example, some games may disable symbol sequences that would inherently disable others, as will be described further below. In the case of the video slot example, this is not a problem, since position, not presence, is the most important ingredient of winning symbol combinations. Therefore, the CPU may generate candidate outcomes until a first fair outcome satisfying the state of all inactive awards is obtained. In this manner, the "4 dollar sign" jackpot can be enabled even though the "3 dollar sign" jackpot is disabled.

In another embodiment, symbol generators dynamically alter symbol probability given that a number of the same symbols have been issued. If multiple winning combinations of the same symbol are offered, it is customary to pay more for more occurrences of the symbol. In this example, and alternate embodiment, funding may be as follows: If the "4 symbol" jackpot (i.e., winning symbol combination) is disabled, the "5 symbol" jackpot is inherently disabled. If the "5 symbol" jackpot is disabled, and the "4 symbol" jackpot is enabled, the symbol generator disables the symbol once 4 symbols have occurred. To maximize the time the "5 symbol" jackpot is offered (i.e., activated) the probability of generating a 5th symbol given that 4 have been generated is adjusted to account for the (average) time symbol generation is disabled (due to lesser awards of the same symbol) among other factors.

Figures 5A, 5B:
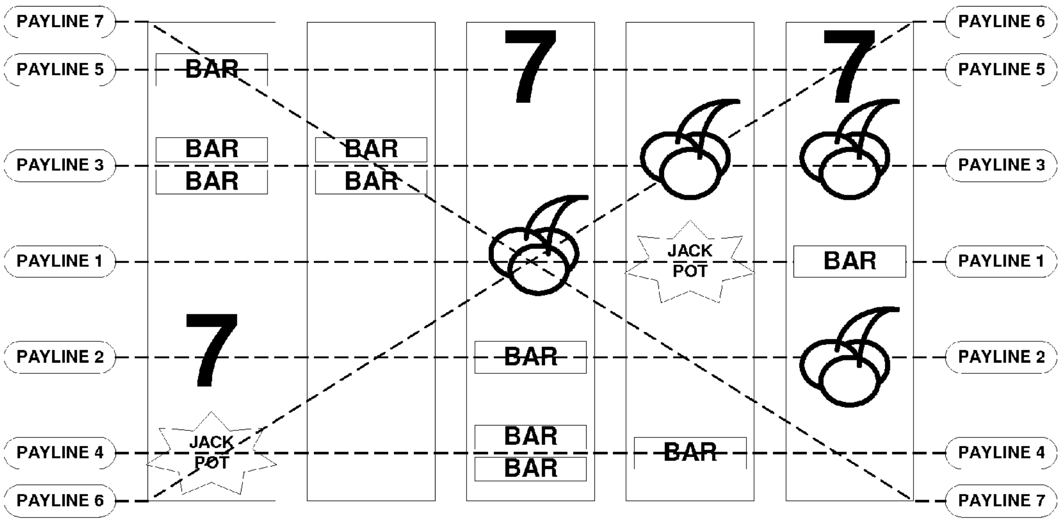
FIGS. 5A-5B illustrate an exemplary gaming machine display and paytable used with the random payout system.

Referring to FIGS. 5A-5B, which respectively illustrate a gaming machine display and paytable, for cherry symbol winning symbol outcomes, a similar situation exists. Disabling a single cherry pay line inherently disables the two cherry and three cherry paylines. Symbol probability may be adjusted for 2nd and third cherry's based upon a number of factors, including the average time symbol generation is disabled. 2nd and 3rd symbol generation is disabled (i.e., probability of a symbol occurrence=0) when 2nd and 3rd cherry symbol pay-lines are disabled, respectively, (due to negative award funding pools).

Other variations of the present invention exist to address complex symbol combinations and sets. For the purposes of example, a single funding pool is associated to, and funds all awards of the same symbol. A single increment rate is established for the single funding pool. All awards of the same symbol are funded by the single funding pool. If the funding pool is negative, symbol generation is disabled. If the funding pool is positive, symbol generation is enabled. The target equation, $$P(w) \geq \frac{ir \cdot uw}{A},$$

may use the average award, or some other award value, or a target award value thereby calculated or approximated to maximize the time all jackpots are offered. The overall expectation of all awards of the same symbol should equal or exceed the time required to fund them for the system to remain regulated. Otherwise, progressive bonus awards may be offered.

Buy-Up and Maximum Wager Eligibility

Figure 6:
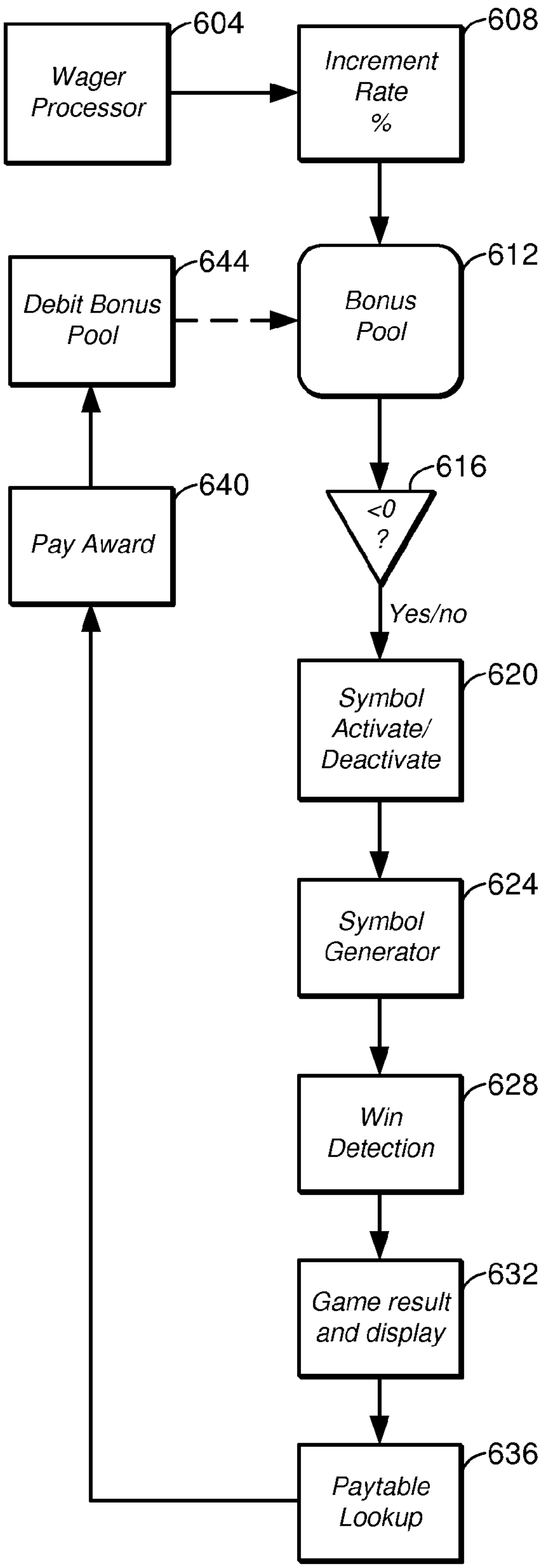
FIG. 6 is a flow diagram illustrating operation of an exemplary funding pool of the random payout system.

One attractive feature of the present invention is an incentive to place larger wagers per game play. To support this in the reel slot bonus game, the size of the wager generating the bonus game play can do one or more of the following: 1) enable multiple number of slot games to be played depending on the size of the wager (commonly achieved by multi-line game formats), or 2) pay a multiplied payout depending on size of wager, funded using a single progressive funding pool per winning symbol combination, with a reference unit bet award a set unit award pay, or the award for maximum wager size, or some other; or 3) maintaining a "bonus wager credit" funding pool or meter, one for each game linked, which tracks partial wagers until a total amount of wagering equals or exceeds a minimum amount, which then triggers a single bonus game play occurrence, which in the case of the reel slot bonus is a single game play (see steps 604 through 644 of the flow diagram of FIG. 6); or 4) buying a reel for every successive level of wagering, where greater number of symbols per game result are generated for each successive level of wagering. In this case, ever-increasing symbol combinations are available only to players making larger wagers.

In one embodiment, players are entitled to all wins at their own pay level and each lesser pay level (extension to the previous method of progressive bonusing). Other variations of these schemes are possible in the present invention.

Player Eligibility and Group Wide Bonus

In prior art link bonus methods eligibility requirements are enforced to ensure the bonus game works. In these prior art systems, removing the eligibility requirement allows players to gain un-reasonable advantage. For example, would be players wait for the most optimal time to start playing the underlying game, gaining un-fair advantage since they only play during activated (group wide) bonus modes.

Most prior art link bonuses fund the bonus award sequence with a single Mystery jackpot type funding pool. They also support the triggering of the bonus jackpot differently, the bonus jackpot trigger being a secret value chosen between a high and low limit. The method of the present invention eliminates and replaces both prior art methods with new and more powerful methods. The present invention eliminates the need for eligibility when paying group wide bonus pools since the bonus mode is enabled at all times, or nearly all times. The present invention eliminates the limitations of paying from a single bonus funding pool using a single bonus trigger. Also, the present invention supports a plurality of bonus pools, each assigned to symbol combination outcomes. The generation of a plurality of symbols, and creating complex award triggers, creates significant variation and flexibility in bonus game design, all using a standard and common set of funding and triggering rules.

While the methods of the present invention are not reliant on "lock-in" type eligibility mechanisms, they can be used to facilitate bonusing during link-wide bonus modes. (A link wide bonus mode is when every game of a bonus link goes into a bonus mode simultaneously). During link wide bonus mode, the controller enables all symbol generation, in accordance to the method of the present invention. The triggers to enable and disable link-wide bonus mode may vary, and include traditional methods in the art. In the present invention, many different methods of triggering based upon the funding levels of the multiple bonus pools may be used to enable and disable the bonus mode. During link wide bonus mode (typically a short period), it is common to offer an elevated payback percentage, and hence, the eligibility lock-in mechanism is generally required.

Addressing Player Walk-away Problem; Back-to-Back Awards

A problem often confronted by prior art link bonus schemes is that of player "walk away" after a large bonus award has been won. The player is aware the bonus will not pay again for some long period. This is common in some systems, such as mystery jackpot systems. The method of the present invention may address this issue by supporting a plurality (set) of funding pools for each winning symbol combination, (i.e. sub-pools). In the basic embodiment, all sub-pools may be configured with an equal share of the total contribution to the symbol combination award. All else being of equal measure, the relative growth of each sub-pool is slower, but average funding is identical and bonus hit frequency is identical. Using this plurality of funding pools (sub-pools per winning symbol combination), "back to back" bonus wins of the same symbol type are possible. Players can be aware of the availability of a bonus funding pool when symbols are being generated, and/or by explicit indication by the bonus system. Symbols are generated as a result of one or more non-negative sub-pools. Available (i.e., funded) sub-pools can be selected in order, and debited if the game outcome results in a payout. If no sub-pools are non-negative, the symbol or award may be disabled. Additional embodiments are possible, such as those where players are not aware of which symbol is enabled for generation. Conversely, there may be embodiments where players are made aware of the availability of awards, based upon the state of symbol generation.

In one alternate embodiment, symbol generation probabilities may be maintained, or modified, but still enabled when the bonus funding pool goes negative and since last being positive. If the award funding pool goes further negative again (since being negative), then the symbol generation is disabled until the funding pool becomes zero or positive (non-negative). Therefore, it is possible to support back-to-back wins and properly fund back-to-back wins. In another embodiment, any number of consecutive back-to-back wins is supported by decreasing the probability of the award after each successive decrease in bonus funding pool (appropriately).

Application to Multi-Coin and Multi-Denomination Paytables

The method of the present invention can support multi-denomination link wide bonuses in several ways. In one embodiment, the system supports a separate set of bonus pools for each denomination of wager. In this manner, there is a plurality of systems, one for each denomination of the system.

In another embodiment, the method of the present invention supports a single award funding pool for each award, common to all denominations of wager. Larger denomination wagers increase the award funding pool proportionately, and decrease the funding pool proportionately if a win occurs. Smaller denomination wagers, and in fact any denomination, increase and decrease the funding pool proportional to their wager also. If an award is disabled as a result of a win from one denomination, because the funding pool is negative the award is disabled for all other denominations. Therefore, the method of the present invention is well suited to handle multi-denominational wagers.

In the embodiment above, the probability of award generation can meet and satisfy $$P(w) \geq \frac{ir \cdot uw}{A}$$

if required. It should be noted that in most cases, betting larger denominations would result in a player receiving a proportionately larger win. In fact, this proportional constant is generally the ratio of the denomination bet to the so-called unit bet. For example, if the unit bet is 5 cents, a 25 cent player is playing for awards that are 5 times as great (versus the same awards offered for the 5 cent wager). Note that in $$P(w) \geq \frac{ir \cdot uw}{A},$$

both the unit wager as well as the award amount changes when denomination changes. In many cases, the scale factors in each of these variables are identical, so they cancel one another. Therefore, the system of this embodiment, using a single funding pool per award combination common to all denominations of wager, uses the same settings for symbol probability regardless of denomination.

In a modified embodiment to that above, the proportion of win amount to wager size need not be a constant. In many of these systems, a larger then proportional award is offered for a proportional increase in wager size. The system of the present invention also supports this feature. The system is so designed to use buy-up paytables, by using the denomination as an index into this paytable. Therefore, each level of denomination wager can support its own pay table entries. Generally, larger wagers are rewarded with the largest payback expectation of the game. The net effect of this arrangement is to award players of larger wager size a larger share of the funding pool, on average, especially if the symbol probability remains the same for all denominations. This is not a limitation of the present invention, since in another embodiment, symbol probability changes given a different denomination, or size, of wager. These concepts can be readily extended to multi-credit buy-up paytables.

Application to Lucky Max, Max Play Bonusing

The method of the present invention supports a significant improvement to prior art random jackpot systems, such as linked jackpot systems. That is, the method provides ability to qualify bonus play on a pre-determined minimum wager size requirement, or a maximum wager requirement. At the same time, the bonus continues to accrue value for wagers of all sizes. This is important. In a standard progressive jackpot of the prior art, one significant factor to their success is the progressive award is only paid if the player makes a maximum size wager. However, a wager of any size contributes to the value of the progressive jackpot, making the jackpot grow quickly. For standard mystery jackpots, the method for triggering the jackpot complicates this objective; all players increment the progressive funding pool, so all players can trigger the jackpot.

The method of the present invention supports the addition of the minimum wager size requirement. Since the method employs a symbol generator with weighted probability, for which various symbol combinations trigger jackpot awards, contributions to bonus pools operate independently from bonus trigger events. Therefore, a bonus jackpot trigger event never interferes with, or is a result of, the process of tracking the bonus funding pool. Players that wager below a predetermined wager threshold are not eligible for the bonus, therefore, the controller does not issue symbols to that player; yet their contribution resulting from their wager is still added to the bonus funding pool(s). Players wagering at the required minimum wager value will also contribute to the bonus funding pool(s), and will be eligible for bonus game play; therefore, an eligible player will receive symbols from the controller, and if a winning symbol combination is detected, the player is paid an associated bonus award.

In theory, an unlimited number of players wagering under the minimum requirement can drive bonus pools too high. In this case, one embodiment offers the bonus awards as progressive jackpots, paying the value of the award funding pool if it exceeds the preset fixed award value.

In an alternative embodiment, a modification is made such that players making a wager less than the minimum threshold will instead fund a "bonus credit play" funding pool. Once the bonus credit play funding pool reaches or exceeds a preset value, usually the minimum credit wager, a bonus game is activated for that round of underlying play only. In this method, players making a wager below the minimum still participate in a bonus round once their accrued value of wagering meets the minimum threshold.

Application to Buy-Up Paytable

Buy-up paytables are those paytables that pay relatively higher payment for a given wager size. For example, if a player wagers a single unit bet, they might receive 10 unit credits on a given award. If that player wagers say 5 unit credits and hits the same jackpot, they may receive 100 credits with a buy-up paytable. In comparison, a simple coin multiplier approach would pay only 50 coins for a 5-credit wager. Buy-up paytables increase the amount paid per unit bet wagered as the size of the wager is increased Buy-up bonuses must do so by measuring the wager placed, and then by offering a larger incremental award for the same incremental amount of wager placed. In the case of several of the bonuses presented using the method of the present invention, the paytable itself only need to support an increased incremental payment for larger wagers. The amount paid by the bonus is debited from the associated bonus funding pool. Multiple bonus pools per award outcome can be used to address the issue of supporting possible back-to-back bonus payments.

Another type of buy-up bonus provides for additional winning combinations when a larger wager is placed. In some novel cases, and claimed in the present invention, the nature of the game embodiment supports this directly, such as in the scatter pay example. For example, only by wagering a larger number of credits are the most rare, and hence most valuable, symbol combinations generated. (Since smaller wagers, such as those generating only 3 symbols or less, are evaluated at end of game cycle, and therefore, 4 or more symbols cannot persist to the next game cycle.) A player must bet larger wagers to generate greater number of symbols per win determination cycle; only then are high value symbol combinations possible in the game format. This fact can be displayed to the player in an enticing manner in one embodiment.

The method of the present invention supports buy-up pay feature in another convenient and novel way. In this embodiment, the number of different symbols enabled for generation increase with the increase in wager. The CPU detects wager size, and enables symbols based upon meeting a specific wager value threshold. Each symbol and/or winning symbol combination is associated with a separate wager threshold value, and if the value of wagering meets or exceeds the wager threshold, that symbol is enabled for generation. This fact can be visualized by/to the player, and hence is an effective manner to support buy-up paytable bonuses. Buy-up awards of this type may be funded by a convenient source, such as a pre-existing bonus funding pool (associated with a related award), or a dedicated bonus funding pool(s). In one embodiment of the invention of the present method, symbol evaluation is delayed until the end of symbol generation, thereby creating more award combinations that are offered to the player.

Application to User Selectable Bonus Pay

The method of the present invention is flexible, and can allow many types of games to be extended to linked operation bonus games. For example, a common base game bonus is the user selected bonus game. In this bonus game, a bonus triggers by some means, and the player is presented with a number of bonus choices. The choices are generally hidden, and then revealed after the player's choice is made. In some embodiments, the system makes the choice automatically, after some period of time has elapsed.

In the method of the present invention, the system allocates a bonus funding pool and associates a symbol occurrence to a linked player bonus event. The player receiving the bonus event is notified of the opportunity to choose among a plurality of bonus choices. After the choice of bonus value is made, the chosen bonus is paid to the player, and its value is debited from the bonus funding pool.

A novel approach to the Bonus pay is claimed in the present invention. The plurality of bonus awards presented to the player is programmable by the casino operator. Increment rates for each bonus funding pool funding the paytable, or other paytables are also configured by the operator. Before and during a bonus trigger, the player is first presented with all available awards associated to non-negative bonus pools. The prizes are then hidden or otherwise obscured, and the player chooses among the bonus choices. The bonus chosen is paid to the player, and the amount is debited by the chosen bonus funding pool. This bonus system provides feedback to the player as to the availability of bonus awards during the course of play.

Application to Double Jackpot and "Times Pay" Jackpot

A difficult to achieve bonus link is the so-called "double jackpot" bonus link. In the basic double jackpot bonus, players are randomly rewarded with a double jackpot; that is, the bonus takes the players base game award and doubles it. Traditionally, Double Jackpot is often supported using a "bonus mode". During the bonus mode, jackpots are doubled for a period of time, or in another version, until a funding pool is exhausted. Both methods have issues, and both methods require an eligibility lockout mechanism, since players not already playing the game prior to the bonus mode should not be eligible for the bonus. The method of the present invention can be applied to the classical Double Jackpot bonus link, to create a fully regulated bonus system that does not require an eligibility lock out mechanism. In the most basic embodiment, double jackpot bonus is active at all times, and any player can wager at any time to be included, or eligible for the bonus.

The bonus system should be stable, and financed using an increment rate funding strategy as explained. Several details to this type of bonus game are unique. For one, the double jackpot award trigger is external, and depends on the outcome of another un-related game. Second, the amount paid is also external to the system, since the system multiplies awards of a base game. In some embodiments, it is desirable to know beforehand if a game is chosen to participate in a double jackpot; this way, the game can create a double jackpot "opportunity", and create further enticement with the player. In one embodiment, the system chooses a player, locks that player in for a bonus round, and allows game play until some minimum amount is paid through the process of doubling, or otherwise multiplying the base game outcome(s). Alternatively, only winning game outcomes are processed for selection of the random award, simplifying the situation since the bonus award will always be paid when a game is selected. Each case is similar with only minor changes to operation and processing.

To implement double jackpot bonus link with the method of the present invention, the act of receiving a single symbol is analogous with the opportunity at, or certainty of, doubling the value paid by the underlying game. If the underlying game results in a jackpot paid to the player, the bonus system doubles it by paying an equal amount as a bonus award. To support this bonus game, a bonus funding pool is associated with the double jackpot bonus award opportunity. An average value of a typical game jackpot may be used as a reference award. An increment rate is assigned to the opportunity. The CPU can determine the probability of "double jackpot opportunity" to occur just before the average award can be funded by $$P(w) \geq \frac{ir \cdot uw}{A},$$

the reference average award and chosen increment rate. In the version where only an "opportunity" is issued, the final base game result is monitored, and if an award is paid, the double jackpot bonus is paid. Otherwise, the bonus is not paid. If the bonus funding pool is negative, the symbol is never issued. Note that since the chance the game results in a pay can be statistically known, this probability in conjunction with the CPU generated symbol probability can be adjusted to achieve optimal results.

Double jackpot time can be extended to "3×" pay, or "5×" pay, or any variation of pay, usually to increase the award. In any case, the value of the award paid is debit from the bonus funding pool. Large awards will drop the bonus funding pool further negative, in which case it will take longer before the award opportunity is enabled again.

To address the issue that the bonus is not active after large bonus jackpots, a plurality of bonus pools are supported. Each bonus funding pool is associated with a probability that a game is selected for bonus play and possible award. Each bonus funding pool can support a different (symbol) selection probability, or the same. Each bonus funding pool is funded by a configurable increment rate. The fact that multiple bonus opportunities are funded allows them to be hit "back to back". This is generally not possible using a single bonus funding pool to select all bonus opportunities. In a basic embodiment, multiple bonus pools are managed in parallel, each in the same manner as the single bonus funding pool case.

Note that the same increment rate assigned to a single bonus funding pool may now be divided among a plurality of bonus pools. All else being equal, the relative growth of multiple bonus pools is slower, so average bonus hit frequency is identical. However, an opportunity now arises to assign different meaning to each bonus funding pool. For example, one bonus funding pool is associated with the opportunity at tripling the base game jackpot. Another funding pool is associated with a 5× times pay opportunity, etc. If any bonus funding pool goes negative, the associated opportunity to select a game for bonus is disabled until that bonus funding pool goes positive. Bonus game dynamics are increased, since each bonus funding pool is paying at a potentially different pay level and rate.

The method of the present invention supports a novel feature to encourage maximum wager game play. In one embodiment, the system only issues double jackpot opportunities to those players making a maximum wager bet, or some other threshold. Players not wagering a maximum wager, or some other threshold, still contribute to the bonus funding pool. In another embodiment, the bonus system maintains a "bonus game credit" funding pool or meter, one for each game linked, which tracks partial wagers until a total amount of wagering equals or exceeds a minimum amount, at which time that wager meeting the minimum buy-in triggers a single bonus game play occurrence, which in the case of the double jackpot bonus is a single symbol generation, where a winning symbol is associated with a double jackpot opportunity.

Variations on a basic implementation are also supported by the method of the present invention. For example, players can receive not just a single double jackpot opportunity, but also a plurality of double jackpot opportunities. The plurality of bonus pays can be granted for a period of time, or as a fixed number of opportunities, or until the bonus funding pool is exhausted, or in another embodiment, until the player receives at least one or more multiplied jackpot(s). In each case, the bonus funding is tracked through the bonus funding pool(s).

Ability to Build Game Paytables from Scratch

It should be noted the modularity and flexibility of the present invention allows for many different games, bonus games, and linked bonus games and jackpots, to be implemented. This is not possible with prior art schemes, as such schemes are coded using a game specific routine, both in terms of funding, payout and game regulation. (These prior art routines do not employ any feedback regulation into the funding method while tying game outcome to independent random symbol generation.)

The method of the present invention allows for a single set of algorithms and a common set of GUI interfaces to support a library of user configurable bonus games and base game types and formats. It is the intent of the present invention that the ability for a casino operator to create, configure and modify their games is made possible. Historically, the casino has generally been barred from creating from scratch a game paytable for the games they own, or games offered by OEM manufacturers. The nature of the algorithms used to create these games do not generally make it simple for a user to make drastic changes to the paytable, since any modification of the paytable will affect the payback expectation, and therefore, at a minimum this must be measured. But measuring new paybacks based upon drastic changes to paytable often results in complex mathematics, and hence is not practical, and likely hazardous in terms of faulty operation if one tried. Yet the methods of the present invention allow users to alter, or re-create from scratch, the paytable of a game while maintaining knowledge of the payback of the game.

In the present invention, a gaming device supporting user configurable paytables must adapt and adjust random symbol generating algorithms appropriately, and with the correct probabilities. In prior art approaches, adapting probabilities requires utmost mathematical accuracy, since even a small deviation or mistake can be costly in terms of causing incorrect, or un-anticipated payback calculation. Calculating the resulting payback in a prior art system involves complex and custom code for each game type, which is quite impractical. On the other hand, with the present invention, the requirement for precise symbol probability is greatly relaxed. The present method allows for significant tolerance in terms of symbol probability accuracy and statistical behavior. In the present method, assessing long-term game payback is simply obtained by summing all increment rate percentages. Moreover, the present invention method self regulates, and therefore provides a safety net in terms of long run payback average.

Algorithms and Apparatus

The method of the present invention may take advantage of many different algorithmic approaches for implementing symbol generators and calculating required symbol probabilities to meet award frequency requirements per the equation, $$P(w) \geq \frac{ir \cdot uw}{A}.$$

Estimating Required Symbol Generator Probabilities

In the case of the scatter pay game example, the symbol probability can be approximated using the probability mass function, and working backward to find the required symbol probability needed by the generator. For example, a bi-section method may be applied on the probability mass function to find the required single symbol probability is one technique that has been used. For example, the single symbol occurrence probability required to meet the desired award probability of 3 identical symbols in 40 opportunities can be found by this method. In the scatter pay example, given the probability of 3 scatter symbols, a probability can be calculated for the symbol generator for a single occurrence that will meet the desired award probability of four symbols using the same process again (since the occurrence of the 4th symbol can only occur over a smaller set of symbol positions on the display). This process can repeat for each allowable occurrence of the same symbol in the game format.

In another embodiment, the game controller may take advantage of game simulation to approximate the required symbol probabilities for each game award outcome. The simulation is performed during the controller configuration process, but is not limited to this. The symbol generators are thereby provided with the required tables of symbol probabilities for each of the user configured awards. Rules for symbol probability table use are generally pre-determined to support the various game types and formats, but the method of the present invention is not restricted to this.

Determining the exact symbol probability is not required. In fact, successful regulation according to $$P(w) \geq \frac{ir \cdot uw}{A}$$

is that the probability be greater than the exact theoretical. A correction factor of say 10% is used in some embodiments to ensure the awards remain regulated over time, unless progressive jackpots will be offered. In other words, the exact probability for the award is purposely and conservatively over estimated, such that the award trigger is more likely to occur before the entire amount of the award is funded, on average.

In one embodiment, the system detects one or more awards which are poorly or improperly configured. In one case, the award funding pool is over funded, so that the award amount is too low, or the increment rate set too high, or the symbol frequency too low. The system notifies the casino operator of this detected condition. The operator is warned, and may be prompted to take some action or make adjustments to the system. In another case, the award is under-funded. In this case, the system notifies the user that the system may need adjustment, based upon revised estimates, new data, and prior game play history. In one embodiment, the system makes the adjustments for each case automatically based upon revised estimates, new data and previous play history.

Random Symbol Generators and Mutually Exclusive Symbol Generators

Random symbol generators may be implemented using a wide variety of hardware, software and algorithmic processes. Most are based upon pseudo-random number generators, whose outputs are processed and mapped onto a symbol probability space, which is usually mutually exclusive.

For the purpose of explanation, and not a restriction of the present invention, a mutual exclusive symbol generator may be used to ensure only one symbol is selected among a plurality of other symbols, each symbol with their own probability of occurrence. Moreover, in the present invention, it is generally advantageous that the symbol generator(s) support the disabling of any particular symbol, or symbols, from being issued. The use of a blank symbol is often convenient in games of the present invention, as they are used as a convenient means of padding or filling in “no symbols”, and optionally used for mapping to disabled symbols.

It is noted that the use of sequential or parallel, hardware or software, or other means of implementation may be used for symbol generation. A random symbol generator that supports configurable symbol output and programmable probability of occurrence is generally desired in the method of the present invention. Mapping a large pseudo-random number space onto a plurality of weighted probability spaces has been used successfully for the methods of the present invention. These spaces can be dynamically changed by the controller as needed to facilitate the desired bonus game configuration, paytable and funding settings input by the operator.

Requiring blank symbols is not a restriction of the present invention. For example, using a relatively high number of symbols causes many different combinations to exist. Deleting a symbol without padding using a “blank or null” symbol necessarily results in all other symbols being more probable. Since in the equation $$P(w) \geq \frac{ir \cdot uw}{A},$$

the effect of a symbol probability being greater generally keeps the game stable, i.e. avoiding over-funding. If no award pools are positive, the bonus game is disabled until a positive funding position is reached. Bonus games structured in this manner may be purposely configured to promote a run-on play of all the available award pools since probability of remaining awards grow.

In a simple extension to the embodiment above, the disabling of a symbol essentially creates a null, or blank, symbol. It is a symbol that is issued, but cannot create an award, which only exists during the symbols disabled period. This disabled symbol can be displayed to the user in a number of different ways, such as graphically, textually, and in other ways common to the art of computer and display interfaces. For example, disabled symbols may be “grayed” out; they occupy a symbol index, or position, but they do not complete any winning combination. In many cases, this simplifies the underlying mathematics in terms of eliminating the need to re-calculate optimal symbol probabilities, since the game outcomes remain unchanged with the exception of the excluded awards. One advantage to this game design approach is to ensure the game payout expectation remains stable, and as specified, on average. Another advantage is the bonus game method communicates to the player which awards are available, and which awards are not.

It is noted that implementation may occur through video scalars and mixers for link bonus system. It is contemplated that in one embodiment plurality of visible awards may be user-selectable. If the winning symbol combination for an award is deactivated, the user may be presented with a notification indicating that the award cannot be selected.

Figure 7:
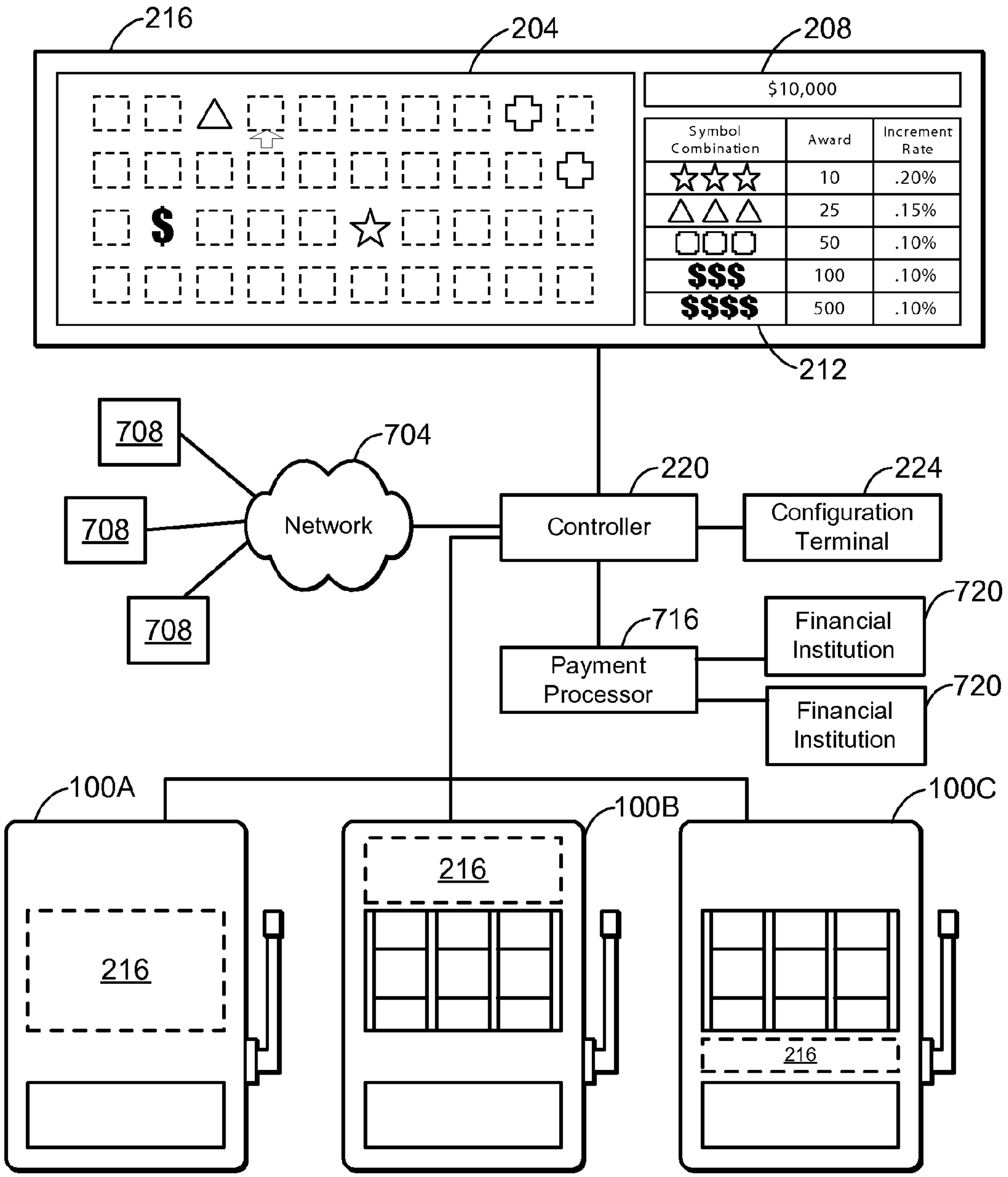
FIG. 7 is a block diagram illustrating an exemplary gaming environment at which the random payout system may be used.

Additional funding options for winning symbol combinations of the random payout system will now be described with regard to FIG. 7. FIG. 7 is a block diagram illustrating an exemplary gaming environment where the random payout system may be used. As can be seen, the gaming environment may include one or more remote terminals 708 in communication with the payout controller 220 via one or more networks 704.

It is contemplated that the network 704 will typically be a wide area network, such as the Internet, to allow remote terminals 708 to communicate wherever they are. The network 704 may alternatively be a local area network, such as a network within a gaming establishment or a network linking multiple gaming establishments. The network 704 may support various proprietary, standards-based, or other communication protocols. Communications through the network 704 may be encrypted or otherwise protected from unauthorized access. Such encryption (and corresponding decryption) may occur at the devices communicating through the network 704. For example, a remote terminal 708 and a payout controller 220 may encrypt and decrypt the data sent therebetween to prevent unauthorized access to the same. In one or more embodiments, the network 704 may comprise one or more wired or wireless communication links, or a combination thereof.

As will be detailed further below, the network 704 and connection thereto may be used to receive funds for individual funding pools established at the random payout system. These funds will typically be received from third parties via a remote terminal 708, and will typically not be wagers. In one or more embodiments for example, a third party may directly fund one or more individual funding pools and, in exchange, receive advertising space at the random payout system. It is contemplated that a third party may be an individual or entity (e.g., a business, partnership, advertiser) that is seeking advertising space.

To illustrate, a third party may be permitted to define a winning symbol combination for a funding pool in exchange for the third party’s funds. This allows the third party to utilize its own advertising material, such as company or product logos, trademarks, or the like to define a winning symbol combination. Players interacting or playing at a gaming machine 100 of the random payout system would then see the third party's advertising material or symbols during game play. Since the players are actively engaged in game play already, they will be highly attuned to the various symbols being presented, including those of the third party. This maximizes the advertising or marketing benefit of the third party's purchase of advertising space at the random payout system.

It is noted that the random payout system may offer solely winning symbol combinations defined by one or more third parties, solely winning symbol combinations defined by a gaming establishment, or a combination of winning symbol combinations defined by one or more third parties and a gaming establishment. Typically, winning symbol combinations defined by gaming establishments will be funded as disclosed above with regard to FIG. 3.

It is noted that the third party symbol(s) may also be displayed on a display area, in or adjacent a game paytable, or other location, providing additional advertising opportunities. The display area may present additional materials to further advertise the third parties products and services while their winning symbol combination on the paytable remains active.

A remote terminal 708 may be a computing device, network appliance, or the like. For example, a remote terminal 708 may be a personal computer, smartphone, tablet, portable media player or the like. In general, a remote terminal 708 comprises one or more input devices, one or more network interfaces and one or more output devices. An input device will be configured to receive input from a user (i.e., the third party), while an output device provides feedback to the user to allow the user to properly interact with the remote terminal. For instance, an input device may be a touch screen, keyboard, mouse or the like, while an output device may be a display screen, speaker, vibration generator or the like. A network interface is configured to allow communication between the remote terminal 708 and a payout controller 220 of the random payout system.

A remote terminal 708 may also comprise one or more processors configured to execute machine readable code or other instructions stored on a memory or storage device. The instructions, when executed, may provide the functionality disclosed herein and further detailed below. The instructions may be stored on a remotely accessible or local storage device, be hardwired into a processor of the remote terminal, or both.

In operation, the remote terminal 708 may provide a user interface via its display screen or other output device. The user interface may prompt a third party for payment information (including account information and a payment amount), symbols, winning symbol combinations and other information. The third party can then utilize one or more input devices of the remote terminal 708 to provide symbols and winning symbol combinations, as well as to submit payment to fund the winning symbol combinations it defines.

The random payout system may also comprise one or more payment processors 716 configured to facilitate transfer of funds from a third party to the random payout system, such as shown in FIG. 7. A payment processor 716 may be a standalone device, such as shown, or may be integrated into another device, such as the payout controller 716. As can be seen, the payment processor 716 will typically be in communication with one or more financial institutions 720. In operation, the payment processor 716 will authorize and initiate transfer of funds between a third party at a remote terminal 708 and the random payout system. For example, the payment processor 716 may receive account information, a payment amount, and authorization to make such payment from the third party via the remote terminal 708, and utilize this information to conduct a transfer of funds.

The account information may comprise one or more account numbers, routing numbers, credit card numbers, debit or other payment card numbers and other information (e.g., personal identification and address information) needed to identify an account from which funds may be transferred. In general, the payment processor 720 will be preconfigured with account information for the random payout system's operator (e.g., a gaming establishments financial account information). In this manner, once authorized by a third party, funds can be transferred from the third party to the random payout system via their respective financial institutions 720 (e.g., banks). In operation, the payment processor 720 may communicate account and authorization information along with a payment amount to the third party's financial institution 720 instructing the same to transfer the payment amount to the random payout systems financial institution.

The payment processor 716 may receive payment and authorization information from a third party's remote terminal 708 at the same time or different times. Such information may be first received by the payout controller 220 and relayed from the payout controller to the payment processor 716. Alternatively, it is contemplated that the payment processor 716 may be connected to the network and receive such information directly.

Once a transfer of funds is completed, the payment processor 716 may report the same to the payout controller 220. The payout controller 220 can then fund the third party's funding pool. In one or more embodiments, the payment processor 716 may report the amount of funds transferred along with an indicator of which winning symbol combination to fund. Typically, the one or more winning symbol combinations the third party desires to fund will be associated with a payment amount by the third party at a remote terminal 708.

Further details regarding the operation of the random payout system and use of third party funds will now be described with regard to the flow diagram of FIG. 8. As will now be described, the random payout system allows third parties to define a winning symbol combination in exchange for providing funds to fund the winning symbol combination's funding pool. As long as the funding pool is active (i.e., is funded), the third party symbols are available for presentation and are presented to players. This provides advertising for third parties (via their symbols) while also funding payout awards for players.

At a step 804, one or more symbols may be received from a third party via its remote terminal. For example, the third party may upload or otherwise provide image files to the remote terminal. The symbols may be advertising material, logos, trademarks and the like as described above. It is contemplated that a symbol may be animated or include a video and/or audio in some embodiments. At a step 808, one or more winning symbol combinations including the third party's symbols may be received from the third party, also via the remote terminal. The third party defines the winning symbol combinations it wishes to fund in this manner.

For example, a third party wishing to advertise its company logo, would upload an image file of the same at step 804 and then define a winning symbol combination including the company logo one or more times at step 808. A winning symbol combination may consist of a single symbol repeated two or more times. Alternatively, a winning symbol combination may consist of a combination of different symbols received from the third party.

The remote terminal will typically transmit the symbols received at step 804 to a payout controller so that the symbols can be presented during game play. In addition, the remote terminal will typically transmit the winning symbol combinations received at step 808 to the payout controller so that a winning outcome including the third party's symbols can be detected by the payout controller and paid out to a player. The payout controller may record the symbols and winning symbol combinations from the third party on an internal or remotely accessible data storage device.

At a step 812, the third party's payment information may be received. This will typically include the account information described above as well as the third party's payment amount. It is contemplated that the random payout system may offer various winning symbol combinations for various payment amounts according to a pricing schedule. For example, the ability to define a winning symbol combination may require higher or lower payment amounts depending on how many symbols are in the desired winning symbol combination.

In some embodiments, the third party may also be permitted to define the award for the winning symbol combinations defined in step 808. This allows the third party to generally define how long the winning symbol combination will be active and available to players. Alternatively, the award may be predefined by the random payout system. For example, the award may be a predefined percentage of the third party's payment amount, or simply a fixed amount. A predefined pricing schedule may specify a predefined award amount for a particular payment amount in some embodiments.

At a decision step 816, if authorization to make payment is received a transfer of the payment amount from the third party to the random payout system (such as via their respective financial institutions) may be conducted at a step 820. If the payment is not authorized, no funds are transferred and the process may return to step 804 to receive symbols from the same or a different third party. Typically, the random payout system's payment processor will receive account information and authorization for the funds transfer and effectuate the transfer as described above.

Once payment is received from the third party, a new funding pool for the winning symbol combination defined at step 808, may be established by the payout controller. The payment amount can then be associated with the funding pool at a step 824, thus funding the funding pool. Because the funding pool is now funded, it is accordingly activated at a step 828, thereby making the associated winning symbol combination available for presentation to players, such as described above with regard to FIG. 3.

At a step 832, a game outcome may be generated, such as by a gaming machine. At a decision step 836, it may be determined, such as by the payout controller, if the game outcome matches the winning symbol combination defined by the third party. If not, another game outcome may be generated at step 832. If the game outcome does match the winning symbol combination, the player that achieved such outcome is paid the award associated with the winning symbol combination at a step 840. At a step 844, the winning symbol combination's associated funding pool is decreased accordingly (typically by the amount of the award paid to the player). Since the associated funding pool was funded by the third party's payment, it can be seen from the above that the third party has paid for the player's award.

As described above, a winning symbol combination remains active unless its associated funding pool becomes negative (i.e., unfunded). Accordingly, at a decision step 848, if the winning symbol combination defined by the third party remains funded, play of the wagering game continues with the winning symbol combination remaining activated. If not, the winning symbol combination is deactivated at a step 852 thereby preventing the third party's symbols from being presented to players.

As can be seen, the capabilities provided by the random payout system permits third parties to add their own winning symbol combinations to wagering games offered by the random payout system. This improves upon the concept of linked bonusing by increasing the availability of funding sources for awards. Namely, the random payout system allows a wide audience of third parties to fund their own awards in exchange for advertising space within the random payout system.

Various third party funding methods are supported by the random payout system as well. For example, as described above, a third party may provide an initial payment amount to fund its winning symbol combination until it is deactivated. Alternatively or in addition, in some embodiments, a third party may structure its payments such that payments are made periodically to pay for the awards paid out during a predefined period of time. For instance, a third party may pay monthly for each award paid out as a result of a player achieving the third party's winning symbol combination(s) within a month (or other period). With this payment structure, as long as the third party makes timely payments, its winning symbol combinations remain active at the random payout system. Because the odds of a winning symbol combination occurring can be accurately estimated, the third party can be reasonably certain about its average costs for advertising with the random payout system. It is noted that a third party's payment authorization may be limited by the third party to a maximum amount. Once the maximum amount is reached, no additional payment would be charged to the third party.

It is contemplated that certain random payout systems may be configured to accept third party funds only from a single third party at a time. This allows the random payout system to have a single exclusive advertiser or sponsor. For example, a Geico™ jackpot or award may be offered in this manner. In such a configuration, a combination of one or more winning symbol combinations defined by the sole third party and one or more winning symbol combinations defined by a gaming establishment can be provided to players.

In one or more embodiments, a random payout system operator may request bids from various third parties for the opportunity to include their own symbols and winning symbol combinations. The highest third party bidder would typically win the bid and be granted the opportunity to include one or more of their own symbols and winning symbol combinations in a wagering game offered via the random payout system.

In some embodiments, third party having made lower bids may be given an opportunity to include one or more of their symbols and winning symbol combinations as well. Typically, the highest or higher third party bidder would be provided the most prominent (e.g., uppermost or largest) location on a paytable and/or display area.

Several tiers of advertising opportunities may be provided if desired. In such case, bidding at each tier determines the which third party obtains the opportunity to include one or more of their own symbols and winning symbol combinations into a wagering game. To illustrate, an embodiment having several tiers of prominence within a paytable may be provided.

In other embodiments, advertising opportunities may be offered to third parties in a round robin manner. In yet another embodiment, advertising opportunities may be offered to third parties at predefined periods of time, with each period having the same or different cost. For example, a gaming establishment may require a higher funding level if a third party desires to fund a winning symbol combination at busier times (e.g., weekends, holidays, during special events at a gaming establishment).

It is contemplated that a third party's winning symbol combination may be enabled or disabled according to player profiles as well. Winning symbol combinations defined by third party advertisers offering certain goods and services that a particular player may be interested in may be selectively offered and displayed to the player in this manner.

The probability of a single symbol occurring, the winning combination probability, and the payout amount may be defined/controlled by the operator. In some embodiments, these combinations may be fixed, or offered within a plurality of fixed choices. A third party may desire that their symbols will be presented to players a particular average number of times between occurrences of their winning symbol combinations. Therefore, despite the play rate, the number of times a third party's symbol is presented will remain fixed on average. In addition, the time a winning symbol outcome is available (i.e., funded) will be fair, since dividing this total time by the total time of all gaming players (who view the paytable) will remain relatively fixed and stable on average.

In some embodiments, a winning symbol combination may include a distinct symbol used to regulate the number of times a third party symbol is presented. For example, a winning symbol combination may include a "wild" card symbol. By setting the probability of the wild card symbol appropriately, the average number of "non-wild" symbol presentations may be well regulated between occurrences of a third party's winning symbol combinations. This provides some flexibility in terms of guaranteeing a third party advertising time and a number of symbol impressions. It is contemplated that the random payout system may optionally charge an additional fee to (or transfer additional funds from) a third party each time one of the third party's symbols is presented to a player.

In some embodiments, a smaller award may be provided for completing winning combinations of non-wild symbols, and a larger award may be provided for completing winning symbol combinations that include "wild" or other special symbols. As stated above, a third party may fund each funding pool independently, and when a given funding pool is depleted, the associated winning symbol combination will be disabled (and/or not displayed on the game's paytable).

It is noted that third party funding disclosed herein may be used in both fixed and progressive jackpots. For fixed jackpots, the jackpot amount may be any amount that a gaming establishment and third party agree to, as described above. For a progressive jackpot, funding of the progressive jackpot's increment may be collected from a portion of a wager placed at each game played, and/or from a third party when one of the third party's symbols is displayed. These funds may be collected in addition to payment from a third party for the opportunity to define their own symbols and winning symbol combinations. A percentage contribution of the total amount paid by the third party may be retained by the gaming establishment as payment for the advertising service, with the remainder being used to fund a progressive jackpot.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A random payout system for a wagering game comprising:

a communication device configured to receive one or more symbols and one or more winning symbol combinations from a third party at a remote terminal, the one or more winning symbol combinations including the one or more symbols;

a paytable having one or more awards, each of the one or more awards associated with at least one of the one or more winning symbol combinations;

a plurality of funding pools, each of the one or more winning symbol combinations associated with a distinct one of the plurality of funding pools; and a controller configured to:

receive a payment authorization to transfer funds from the third party;

fund the one or more funding pools with a payment amount from the third party;

present a game symbol from one of the winning symbol combinations when the winning symbol combination's associated funding pool is positive, wherein the game symbol is not presented if the associated funding pool is not positive; and payout the award associated with one of the plurality of winning symbol combinations when every game symbol within the winning symbol combination is presented to a player.

2. The random payout system of claim 1, wherein the payment amount is limited to a maximum amount defined by the third party.

3. The random payout system of claim 1, wherein the funds from the third party are transferred from one of the third party's accounts at one or more financial institutions.

4. The random payout system of claim 1, wherein the controller decrements a funding pool associated with a winning symbol combination when the winning symbol combination occurs.

5. The random payout system of claim 1, wherein the controller selects the game symbol for presentation based on a predefined probability.

6. The random payout system of claim 1, wherein the controller is configured to transfer additional funds from the third party each time the game symbol from the one or more winning symbol outcomes is presented.

7. The random payout system of claim 1, wherein the plurality of winning symbol combinations are symbol combinations having distinct symbols.

8. A random payout system for a wagering game comprising:

a communication device configured to receive one or more third party symbols and one or more winning symbol combinations consisting of the one or more third party symbols from a third party at a remote terminal;

a paytable comprising a plurality of winning outcomes, wherein at least one of the plurality of winning outcomes is one of the winning symbol combinations;

at least one controller configured to:

receive one or more payment authorizations from the third party, the one or more payment authorizations authorizing one or more payment amounts; and payout an award when all symbols of one of the plurality of winning outcomes is presented; and a plurality of funding pools, each associated with a distinct one of the plurality of winning outcomes, wherein the at least one controller is configured to allocate the one or more payment amounts to one or more of the plurality of funding pools, and to individually decrement one of the plurality of funding pools upon occurrence of its associated winning outcome;

wherein the at least one controller presents one or more symbols from a winning outcome as long as the winning outcome's associated funding pool is positive and stops presenting the one or more symbols from the winning outcome when the winning outcome's associated funding pool is negative.

9. The random payout system of claim 8, wherein the at least one controller is further configured to:

receive one or more wager amounts corresponding to one or more wagers placed at one or more gaming machines in communication with the at least one controller; and allocate at least a portion of the one or more wager amounts to one or more of the plurality of funding pools.

10. The random payout system of claim 8, wherein the remote terminal is connected to the communication device via a network selected from the group consisting of a wide area network and a local area network.

11. The random payout system of claim 8, wherein, in addition to the winning symbol combination received from the remote terminal, the paytable further comprises one or more predefined winning outcomes.

12. The random payout system of claim 8, wherein the controller is configured to accept a predefined probability of occurrence for the plurality of winning outcomes, whereby the plurality of winning outcomes occur as defined by their respective probability of occurrence.

13. The random payout system of claim 8, wherein the one or more payment amounts are limited to a maximum total amount by the third party.

14. A method for providing random payouts to one or more wagering game players comprising:

providing a controller configured to accept one or more symbols and one or more winning symbol combinations from a third party at a remote terminal, the one or more winning symbol combinations comprising the one or more symbols;

receiving account information and one or more payment authorizations from the third party at a payment processor;

allocating one or more payment amounts authorized by the one or more payment authorizations to one or more of a plurality of funding pools;

associating the each of the plurality of funding pools with at least one of the one or more winning symbol combinations;

disabling presentation of one or more symbols of a winning symbol combination when the winning symbol combination's funding pool is negative;

enabling presentation of one or more symbols of a winning symbol combination when the winning symbol combination's funding pool is non-negative;

awarding the one or more players an award amount when the at least one of the one or more symbol combinations is achieved; and decrementing a funding pool associated with the at least one of the one or more symbol combinations when the at least one of the one or more symbol combinations is achieved.

15. The method of claim 14, wherein the one or more payment amounts are limited to a maximum amount defined by a third party.

16. The method of claim 14 further comprising connecting to the remote terminal from the controller via a network selected from the group consisting of a local area network and a wide area network.

17. The method of claim 14, wherein the paytable comprises one or more predefined winning symbol combinations, and the controller adds the one or more winning symbol combinations received from the remote terminal to the paytable as they are received.

18. The method of claim 14, further comprising charging the third party when one or more symbols of the one or more winning symbol combinations is presented to a player.

19. The method of claim 14 further comprising receiving at the controller the one or more probabilities of occurrence for one or more of the one or more winning symbol combinations.

20. The method of claim 14, wherein the one or more winning symbol combinations are symbol combinations having distinct symbols.

* * * * *